US008411752B2

(12) United States Patent
Farkash

(10) Patent No.: US 8,411,752 B2
(45) Date of Patent: Apr. 2, 2013

(54) VIDEO SIGNATURE

(75) Inventor: Eyal Farkash, Raanana (IL)

(73) Assignee: NDS Limited, Staines, Middlesex (GB)

( * ) Notice: Subject to any disclaimer, the term of this patent is extended or adjusted under 35 U.S.C. 154(b) by 548 days.

(21) Appl. No.: 12/734,643

(22) PCT Filed: Oct. 29, 2008

(86) PCT No.: PCT/IB2008/054472
§ 371 (c)(1),
(2), (4) Date: Jun. 7, 2010

(87) PCT Pub. No.: WO2010/049755
PCT Pub. Date: May 6, 2010

(65) Prior Publication Data
US 2010/0302450 A1 Dec. 2, 2010

(51) Int. Cl.
*H04N 7/12* (2006.01)
(52) U.S. Cl. .................................. 375/240.16
(58) Field of Classification Search ............ 375/240.16; 707/E17.03, E17.027, E17.028; 348/700; 382/236; 386/243
See application file for complete search history.

(56) References Cited

U.S. PATENT DOCUMENTS

| | | | |
|---|---|---|---|
| 4,907,080 A | | 3/1990 | Campbell et al. |
| 5,870,754 A | | 2/1999 | Dimitrova et al. |
| 6,389,168 B2 * | | 5/2002 | Altunbasak et al. .......... 382/224 |
| 6,404,455 B1 * | | 6/2002 | Ito et al. .................... 348/169 |
| 6,466,670 B1 | | 10/2002 | Tsuria et al. |
| 6,501,794 B1 * | | 12/2002 | Wang et al. ............. 375/240.08 |
| 6,633,651 B1 | | 10/2003 | Hirzalla et al. |
| 6,961,467 B2 | | 11/2005 | Sirivara et al. |
| 6,968,337 B2 | | 11/2005 | Wold |
| 2001/0004739 A1 * | | 6/2001 | Sekiguchi et al. ............ 707/100 |

(Continued)

FOREIGN PATENT DOCUMENTS

| | | |
|---|---|---|
| GB | 2 369 203 A | 5/2002 |
| GB | 2 419 489 B | 2/2007 |

(Continued)

OTHER PUBLICATIONS

"Video Indexing Using MPEG Motion Compensation Vectors" Ardizzone et al. IEEE International Conference on Multimedia Computing and systems, Jun. 1999.*

(Continued)

*Primary Examiner* — Mehrdad Dastouri
*Assistant Examiner* — Mohammed Rahaman
(74) *Attorney, Agent, or Firm* — Husch Blackwell LLP

(57) ABSTRACT

A system for creating a video signature, including a video retrieval module to retrieve a video sequence having a plurality of frames, each of the frames including an image, a region definition module to define a plurality of image regions for the image of each of the frames, such that the image regions occupy the same portions of the image for each of the frames, a motion analysis module to calculate a plurality of motion vectors, such that one of the motion vectors is calculated for each of the image regions of each of the frames by comparison to the image of another one of the frames, each of the motion vectors having a direction of motion and a magnitude of motion, and a signature creation module to create the video signature including data indicative of the direction of motion and the magnitude of motion for each of the image regions of each of the frames. Related apparatus and methods are also described.

19 Claims, 15 Drawing Sheets

U.S. PATENT DOCUMENTS

| | | | |
|---|---|---|---|
| 2002/0087885 A1 | 7/2002 | Peled et al. | |
| 2007/0220592 A1 | 9/2007 | Muehlbauer | |
| 2008/0317127 A1* | 12/2008 | Lee et al. | 375/240.16 |
| 2010/0027667 A1* | 2/2010 | Samuelsson et al. | 375/240.16 |

FOREIGN PATENT DOCUMENTS

| | | |
|---|---|---|
| WO | WO 2005/043359 A1 | 5/2005 |
| WO | WO 2008/059393 A2 | 5/2008 |
| WO | WO 2008/096281 A1 | 8/2008 |

OTHER PUBLICATIONS

Sahouria, E.; Zakhor, A., "Motion indexing of video," Image Processing, 1997. Proceedings., International Conference on , vol. 2, no., pp. 526-529 vol. 2, Oct. 26-29, 1997.*

"Compressed domain video indexing techniques using DCT and motion vector information in MPEG video", Kobla et al, pp. 200-211 SPIE vol. 3022, 1997.*

Compressed domain video retrieval using object and global motion descriptors R. Venkatesh Babu • K. R. Ramakrishnan, Springer Science Oct. 2006.*

E. Ardizzone et al., "Video Indexing Using MPEG Motion Compensation Vectors" (IEEE 1999).

Pradeep K. Atrey et al., "A Scalable Signature Scheme for Video Authentication" *Multimed Tool Appl* 34, pp. 107-135 (2007) (Springer Science Dec. 9, 2006).

Sen-Ching S. Cheung et al., "Efficient Video Similarity Measurement With Video Signature" (Dept. of EE and Computer Sciences, Univ. of Calif., Berkeley).

Sen-Ching S. Cheung et al., "Fast Similarity Search and Clustering of Video Sequences on the World-Wide-Web" (Center for Applied Scientific Computing, Lawrence Livermoore National Laboratory).

Sen-Ching S. Cheung et al., "Video Similarity Detection With Video Signature Clustering" (Dept. of EE and Computer Sciences, Univ. of Calif., Berkeley).

Arun Hampapur et al., "Comparison of Sequence Matching Techniques for Video Copy Detection" (IBM T.J. Watson Research Center, Jan. 1, 2002).

Jonathan Hirson, "Motion DSP Announces Ikena Copyright New Video Copyright Detection Technology" (Motion DSP, Mar. 13, 2006).

Timothy C. Hoad et al., "Fast Video Matching With Signature Alignment" (MIR '03, Nov. 7, 2003).

Xian-Sheng Hua et al., "Robust Video Signature Based on Ordinal Measure" (Microsoft Research Asia, Beijing, China).

Vikrant Kobla et al., "Compressed Domain Video Indexing Techniques Using DCT and Motion Vector Information in MPEG Video" (Center for Automation Research, Univ. of Md., Feb. 13, 1997).

Marc Schneider et al., "A Robust Content Based Digital Signature for Image Authentication" XP002090178, pp. 227-230 (IEEE 1996).

Giovanni Tardini et al., "Shot Detection and Motion Analysis for Automatic MPEG-7 Annotation of Sports Videos" *ICIAP 2005, LNCS 3617*, pp. 653-660 (Springer-Verlag 2005).

Hualu, Wang et al., "Survey of Compressed-Domain Features Used in Audio-Visual Indexing and Analysis" J. Vis. Commun. Image R. 14, pp. 150-183 (2003).

"Call for Proposals on Image & Video Signature Tools" ISO/IEC JTC1/SC29/WG11 MPEG2007/N9216 (Jul. 2007).

"IDÉE Inc.—Visual Search Solutions".

"MotionDSP" (MotionDSP 2007).

* cited by examiner

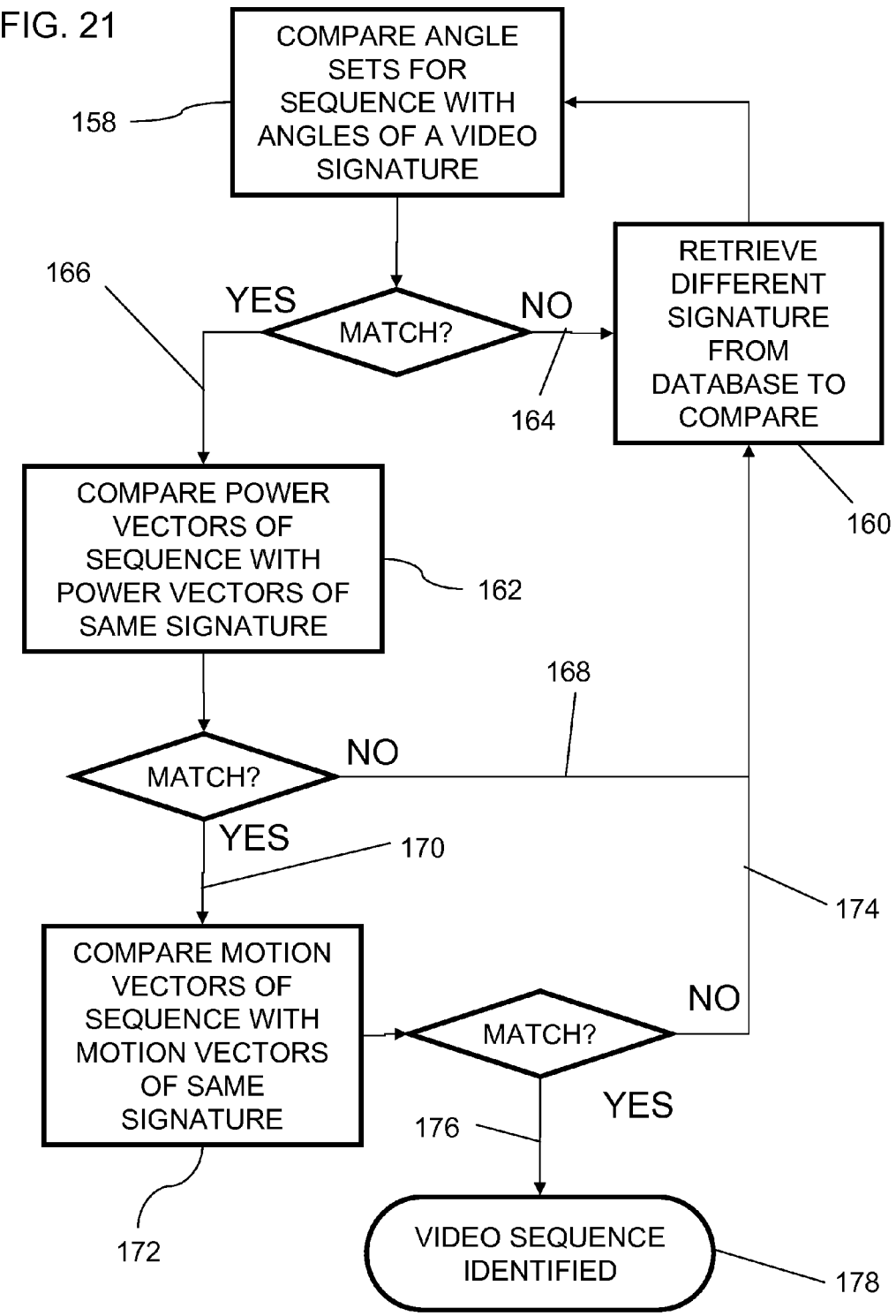

VIDEO SIGNATURE

The present application is a 35 USC §371 application of PCT/IB2008/054472, filed on 29 Oct. 2008 and entitled "Video Signature", which was published on 6 May 2010 in the English language with International Publication Number WO 2010/049755.

FIELD OF THE INVENTION

The present invention relates to video signatures.

BACKGROUND OF THE INVENTION

The following references are also believed to represent the state of the art:

US Published Patent Application 2002/0087885 of Peled, et al.;

US Published Patent Application 2007/0220592 of Muehlbauer;

U.S. Pat. No. 4,907,080 to Campbell, at al.;

U.S. Pat. No. 5,870754 to Dimitrova, et al.;

U.S. Pat. No. 6,466,670 to Tsuria, et al.;

U.S. Pat. No. 6,633,651 to Hirzalla, et al.;

U.S. Pat. No. 6,961,467 to Sirivara, et al.;

U.S. Pat. No. 6,968,337 to Wold;

PCT Published Patent Application WO2005/043359 of Macrovision

Corporation;

PCT Published Patent Publication WO2008/059393 of NDS Limited;

PCT Published Patent Publication WO2008/096281 of NDS Limited;

UK Published Patent Application GB2369203 of Assertion Limited;

Paper entitled "Efficient video similarity measurements with video signature" by Sen-ching S. Cheung and Avideh Zakhor, University of California, Berkeley;

Paper entitled "Video similarity detection with video signature clustering" by Sen-ching S. Cheung and Avideh Zakhor, University of California, Berkeley;

Paper entitled "Fast similarity search and clustering of video sequences on the world-wide web" by Sen-ching S. Cheung, Center of Applied Scientific Computing Lawrence Livermore National Laboratory and Avideh Zakhor, University of California, Berkeley;

Paper entitled "Robust video signature based on ordinal measure" by Xian-Sheng Hua, Xian Chen and Hong-Jiang Zhang, Microsoft Research, Asia;

Paper entitled "Fast video matching with signature alignment" by Timothy C. Hoad and Justin Zobel, RMIT University, Melbourne, Australia;

Paper entitled "A scalable signature scheme for video authentication" by Pradeep Atrey, Wei-Qi Yan, Mohan S. Kankanhalli, National University of Singapore;

Press Release Mar. 13, 2006 of Motion DSP for Ikena Copyright;

Paper entitled "Call for proposals on image & video signature tools" by International Organisation for Standardization, ISO/IEC JTC1/SC29/WG11, Coding Of Moving Pictures And Audio, MPEG Video Sub-Group, July 2007;

Paper entitled "A robust content based digital signature for image authentication" by Marc Schneider and Shih-Fu Chang, Columbia University; and Extracts from the website of IDDE Inc for Image monitoring service.

SUMMARY OF THE INVENTION

The present invention, in certain embodiments thereof, seeks to provide an improved video signature system.

There is thus provided in accordance with an embodiment of the present invention a system for creating a video signature, including a video retrieval module to retrieve a video sequence having a plurality of frames, each of the frames including an image, a region definition module to define a plurality of image regions for the image of each of the frames, such that the image regions occupy the same portions of the image for each of the frames, a motion analysis module to calculate a plurality of motion vectors, such that one of the motion vectors is calculated for each of the image regions of each of the frames by comparison to the image of another one of the frames, each of the motion vectors having a direction of motion and a magnitude of motion, and a signature creation module to create the video signature including data indicative of the direction of motion and the magnitude of motion for each of the image regions of each of the frames.

Further in accordance with an embodiment of the present invention the video sequence includes at least fifty of the frames.

Still further in accordance with an embodiment of the present invention the motion analysis module is operative to calculate the motion vectors, such that a multiplicity of the motion vectors are calculated for each of the image regions of each of the frames by comparison to the images of other ones of the frames.

Additionally in accordance with an embodiment of the present invention the image of each of the frames includes at least three of the image regions, and the signature creation module is operative to create the video signature including data indicative of the direction of motion and the magnitude of motion for each of the at least three image regions of each of the frames.

Moreover in accordance with an embodiment of the present invention the image of each of the frames includes at least four of the image regions, and the signature creation module is operative to create the video signature including data indicative of the direction of motion and the magnitude of motion for each of the four image regions of each of the frames.

Further in accordance with an embodiment of the present invention each of the image regions includes a plurality of sub-regions, and the motion analysis module is operative to calculate the one motion vector for each of the image regions of each of the frames by averaging a multiplicity of other motion vectors calculated for the sub-regions.

Still further in accordance with an embodiment of the present invention the motion analysis module is operative to determine a plurality of angles including a set of the angles for each of the frames, for each one of the frames, the set of the angles is at least partially defined by the motion vectors of the one frame, and the signature creation module is operative to create the video signature including the set of angles for each of the frames.

Additionally in accordance with an embodiment of the present invention for each one of the frames, the set of angles is also defined by a plurality of connecting vectors connecting the motion vectors of the one frame.

Moreover in accordance with an embodiment of the present invention each of the angles is defined by one of the motion vectors and one of the connecting vectors.

Further in accordance with an embodiment of the present invention each of the motion vectors has a head and tail, each of the connecting vectors being connected to a tail of one of the motion vectors and a head of another one of the motion vectors.

Still further in accordance with an embodiment of the present invention the angles in the set of angles are ordered consistently with respect to the motion vectors for each of the frames.

Additionally in accordance with an embodiment of the present invention, the system includes an image identification module to identify the image within one of the frames, and determine a measurement of a size of the image, wherein the signature creation module is operative to create the video signature including the measurement of the size of the image.

Moreover in accordance with an embodiment of the present invention the image identification module is operative to determine a measurement of an orientation of the image, and the signature creation module is operative to create the video signature including a measurement of the orientation of the image.

Further in accordance with an embodiment of the present invention, the system includes a discrete cosine transform module to perform at least one discrete cosine transform for each of the image regions of each of the frames yielding at least one DC coefficient for each of the image regions of each of the frames, and determine a value based on the at least one DC coefficient, wherein the signature creation module is operative to create the video signature including the value for each of the image regions of each of the frames.

Still further in accordance with an embodiment of the present invention, the system includes an image extractor to extract a luminance component of the image of each of the frames so that the motion analysis module is operative to calculate the motion vectors in a black and white domain based on the luminance component.

Additionally in accordance with an embodiment of the present invention, the system includes an image scaler to resize the frames to a predefined resolution.

Moreover in accordance with an embodiment of the present invention the frames are uncompressed video frames.

There is also provided in accordance with still another embodiment of the present invention a system for comparing a video sequence with at least one video signature, the system including a storage arrangement to store the at least one video signature, a video retrieval module to retrieve the video sequence having a plurality of frames, each of the frames including an image, a region definition module to define a plurality of image regions for the image of each of the frames, such that the image regions occupy the same portions of the image for each of the frames, a motion analysis module to calculate a plurality of motion vectors, such that one of the motion vectors is calculated for each of the image regions of each of the frames by comparison to the image of another one of the frames, each of the motion vectors having a direction of motion and a magnitude of motion, and a signature comparison module to compare the magnitude of motion of the one motion vector for each of the image regions of each of the frames with the at least one video signature.

Further in accordance with an embodiment of the present invention the signature comparison module is operative to compare the direction of motion of the one motion vector for each of the image regions of each of the frames with the at least one video signature.

Still further in accordance with an embodiment of the present invention the video sequence includes at least fifty of the frames.

Additionally in accordance with an embodiment of the present invention the image of each of the frames includes at least three of the image regions.

Moreover in accordance with an embodiment of the present invention the image of each of the frames includes at least four of the image regions.

Further in accordance with an embodiment of the present invention each of the image regions includes a plurality of sub-regions, and the motion analysis module is operative to calculate the one motion vector for each of the image regions of each of the frames by averaging a multiplicity of other motion vectors calculated for the sub-regions.

Still further in accordance with an embodiment of the present invention the motion analysis module is operative to determine a plurality of angles including a set of the angles for each of the frames, for each one of the frames, the set of the angles is at least partially defined by the motion vectors of the one frame, the signature comparison module is operative to compare the set of the angles for each of the frames with the at least one video signature.

Additionally in accordance with an embodiment of the present invention for each one of the frames, the set of angles is also defined by a plurality of connecting vectors connecting the motion vectors of the one frame.

Moreover in accordance with an embodiment of the present invention each of the angles is defined by one of the motion vectors and one of the connecting vectors.

Further in accordance with an embodiment of the present invention each of the motion vectors has a head and tail, each of the connecting vectors being connected to a tail of one of the motion vectors and a head of another one of the motion vectors.

Still further in accordance with an embodiment of the present invention the angles in the set of angles are ordered consistently with respect to the motion vectors for each of the frames.

Additionally in accordance with an embodiment of the present invention, the system includes an image identification module to identify the image within one of the frames, and determine a measurement of a size of the image, wherein the signature comparison module is operative to compare the one motion vector for each of the image regions of at least one of the frames with the at least one video signature based on the measurement of the size of the image.

Moreover in accordance with an embodiment of the present invention the image identification module is operative to determine a measurement of an orientation of the image, and wherein the signature comparison module is operative to compare the one motion vector for each of the image regions of at least one of the frames with the at least one video signature based on the measurement of the orientation of the image.

Further in accordance with an embodiment of the present invention, the system includes a discrete cosine transform module to perform at least one discrete cosine transform for each of the image regions of each of the frames yielding at least one DC coefficient for each of the image regions of each of the frames, and determine a value based on the at least one DC coefficient, wherein the signature comparison module is operative to compare the value for each of the image regions of each of the frames with the at least one video signature.

Still further in accordance with an embodiment of the present invention, the system includes an image extractor to extract a luminance component of the image of each of the frames so that the motion analysis module is operative to calculate the motion vectors in a black and white domain based on the luminance component.

Additionally in accordance with an embodiment of the present invention, the system includes an image scaler to resize the frames to a predefined resolution.

Moreover in accordance with an embodiment of the present invention the frames are uncompressed video frames.

There is also provided in accordance with still another embodiment of the present invention a method for creating a video signature, including retrieving a video sequence having a plurality of frames, each of the frames including an image, defining a plurality of image regions for the image of each of the frames, such that the image regions occupy the same portions of the image for each of the frames, calculating a plurality of motion vectors, such that one of the motion vectors is calculated for each of the image regions of each of the frames by comparison to the image of another one of the frames, each of the motion vectors having a direction of motion and a magnitude of motion, and creating the video signature including data indicative of the direction of motion and the magnitude of motion for each of the image regions of each of the frames.

There is also provided in accordance with still another embodiment of the present invention a method for comparing a video sequence with at least one video signature, the method including storing the at least one video signature, retrieving the video sequence having a plurality of frames, each of the frames including an image, defining a plurality of image regions for the image of each of the frames, such that the image regions occupy the same portions of the image for each of the frames, calculating a plurality of motion vectors, such that one of the motion vectors is calculated for each of the image regions of each of the frames by comparison to the image of another one of the frames, each of the motion vectors having a direction of motion and a magnitude of motion, and comparing the magnitude of motion of the one motion vector for each of the image regions of each of the frames with the at least one video signature.

BRIEF DESCRIPTION OF THE DRAWINGS

The present invention will be understood and appreciated more fully from the following detailed description, taken in conjunction with the drawings in which:

FIG. 21 is a flowchart showing steps in a method of comparing the video sequence with video signature(s) in the sub-system of FIG. 19.

DETAILED DESCRIPTION OF AN EMBODIMENT

Figure 1:
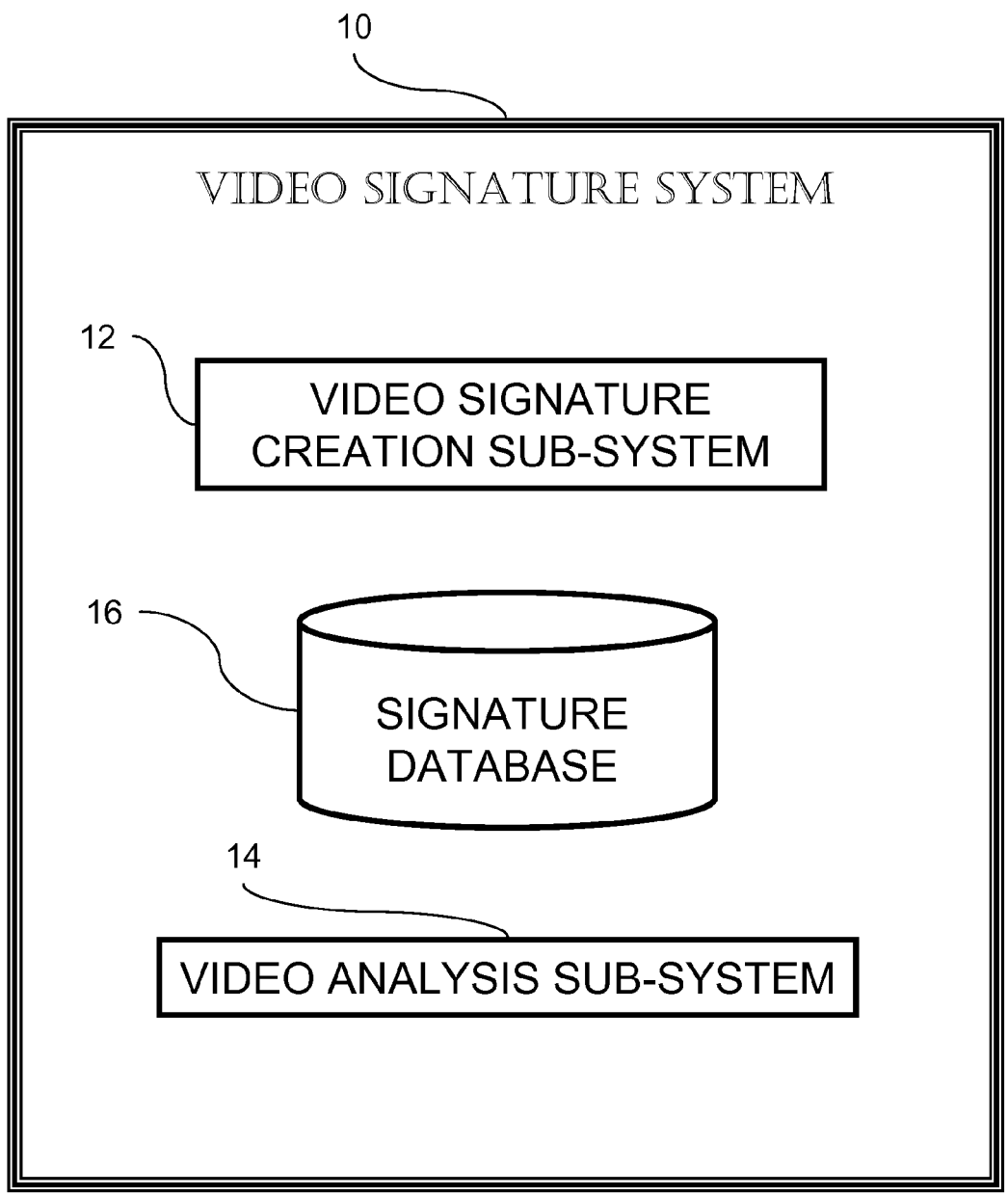
FIG. 1 is a block diagram view of video signature system constructed and operative in accordance with an embodiment of the present invention.

Reference is now made to FIG. 1, which is a block diagram view of video signature system 10 constructed and operative in accordance with an embodiment of the present invention. The video signature system 10 includes a video signature creation sub-system 12, a video analysis sub-system 14 and a signature database 16.

The video signature creation sub-system 12 is operative to create one or more video signatures. The resulting video signature(s) are then stored in the signature database 16. The video signature creation sub-system 12 is described in more detail with reference to FIGS. 5-18.

For the purposes of the video signature system 10, it is generally assumed that a movie is the same movie whether the movie has been re-encoded, filtered and/or scaled, some frames are dropped, rotated, colored, and/or modified, for example, a scene may be replaced by a scene from a different movie or the movie colors may be modified or removed.

The video analysis sub-system 14 analyzes videos for comparing to one or more of the video signatures stored in the signature database 16. The video analysis sub-system 14 is described in more detail with reference to FIGS. 19-21.

It will be appreciated by those ordinarily skilled in the art that the video signature creation sub-system 12 and the video analysis sub-system 14 may be implemented separately or together in a single system such as the video signature system 10.

The video signature system 10 is typically implemented in a suitable processing system, for example, but not limited to, a computer system.

The term "video" as used in the specification and claims, is defined as a sequence of images, for example, correlated images such as movies, clips, TV shows, home videos.

Figure 2:
FIG. 2 is a block diagram view of a video signature being extracted using the system of FIG. 1.

Reference is now made to FIG. 2, which is a block diagram view of a video signature 18 being extracted using the system 10 of FIG. 1. In one mode of operation, the video signature system 10 extracts the video signature 18 of a video 20.

Figure 3:
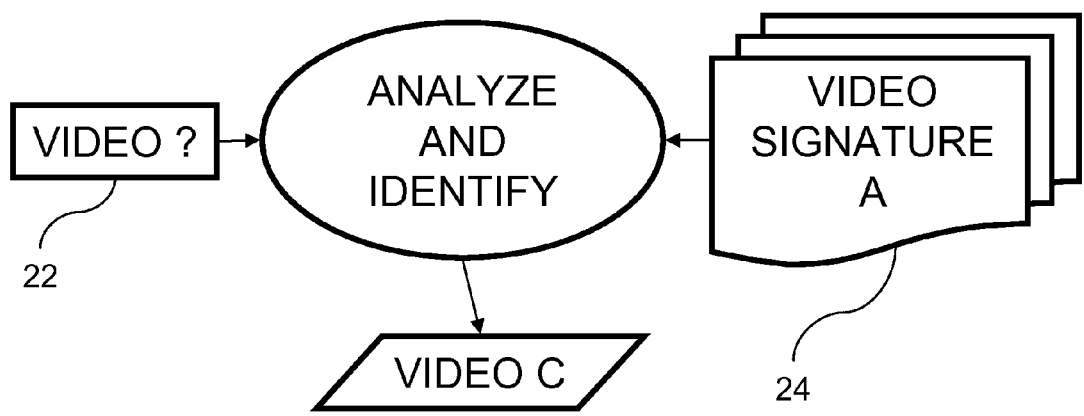
FIG. 3 is a block diagram view of a first method of analyzing a video using the system of FIG. 1.

Reference is now made to FIG. 3, which is a block diagram view of a first method of analyzing a video 22 using the system 10 of FIG. 1. The video 22 is compared to one or more video signatures 24 until the video 22 is identified as video "C".

Figure 4:
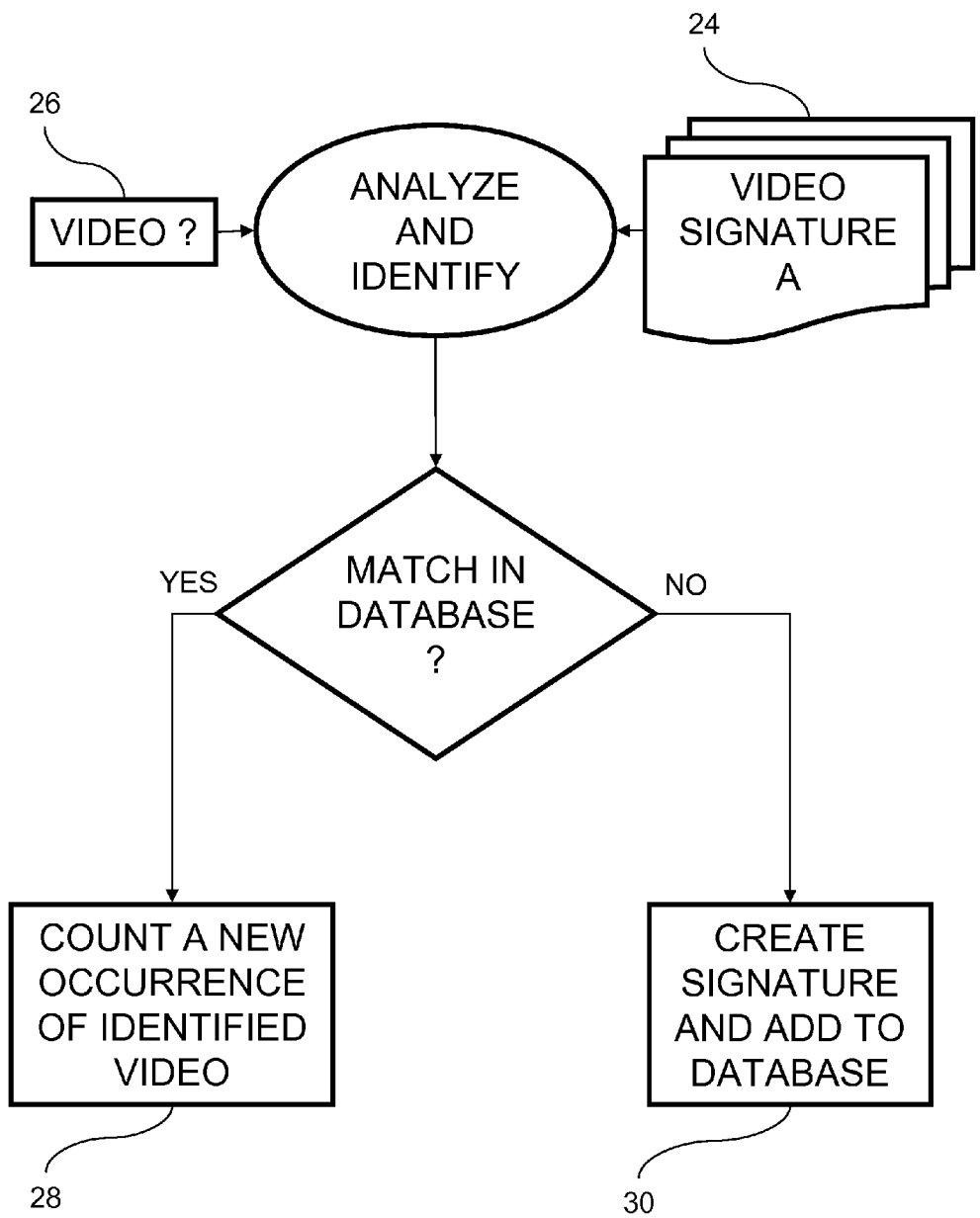
FIG. 4 is a block diagram view of a second method of analyzing a video using the system of FIG. 1.

Reference is now made to FIG. 4, which is a block diagram view of a second method of analyzing video using the system 10 of FIG. 1. A video 26 is analyzed in order to identify the video 26 by comparing the video 26 to the video signatures 24. If the video 26 matches one of the video signatures 24 in the signature database 16 (FIG. 1), then a new occurrence of the identified video 26 is counted by the video signature system 10 (block 28). If the video 26 does not match any of the video signatures 24 in the signature database 16, then a new video signature is created for the video 26. The new video signature is added to the signature database 16 (block 30).

Figure 5:
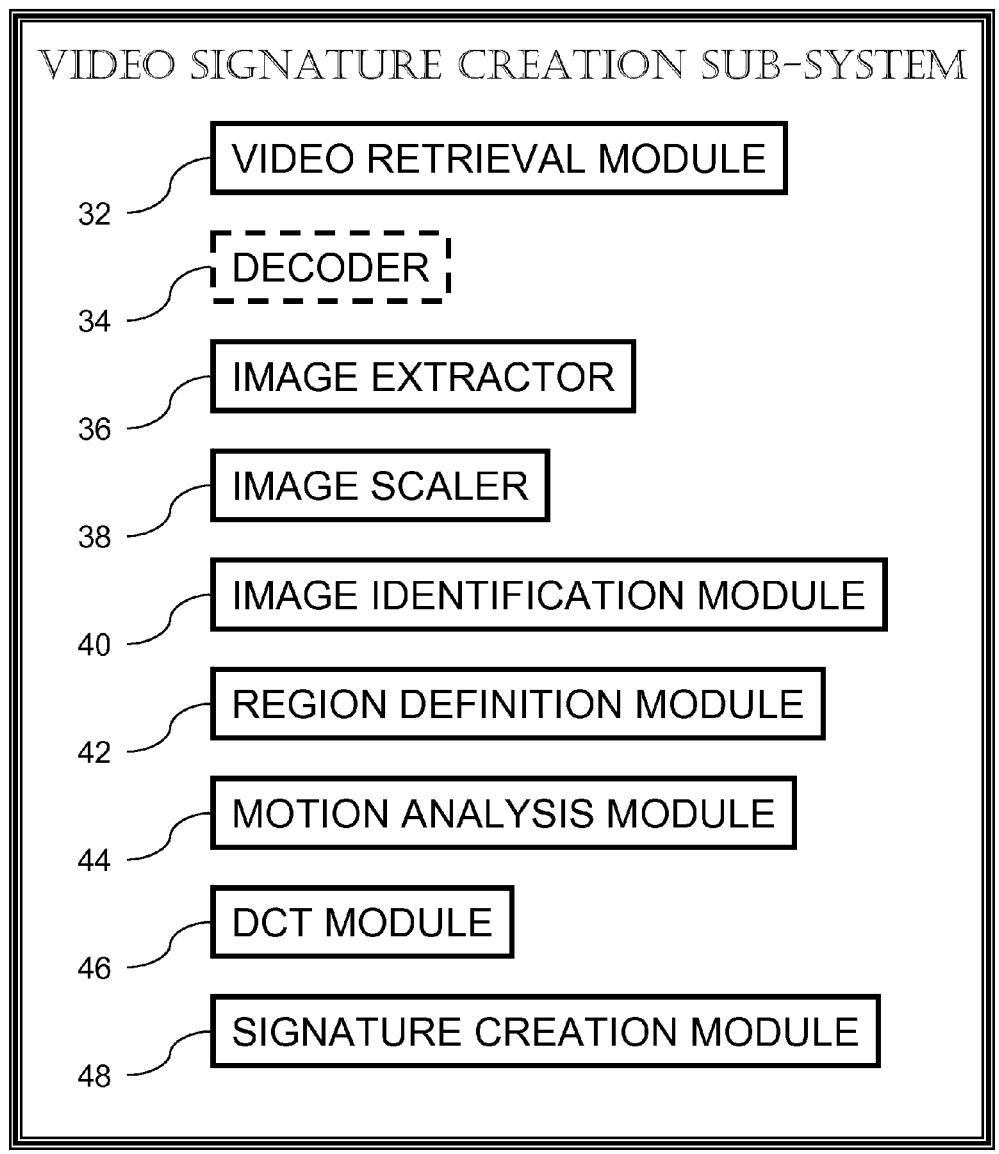
FIG. 5 is a block diagram view of a video signature creation sub-system of the system of FIG. 1.

Reference is now made to FIG. 5, which is a block diagram view of a video signature creation sub-system 12 of the system 10 of FIG. 1. The video signature creation sub-system 12 includes a video retrieval module 32, a decoder 34, an image extractor 36, an image scaler 38, an image identification module 40, a region definition module 42, a motion analysis module 44, a discrete cosine transform (DCT) module 46 and a signature creation module 48. The modules of the video signature creation sub-system 12 are operationally connected and are described in more detail with reference to FIGS. 6-18.

Figure 6:
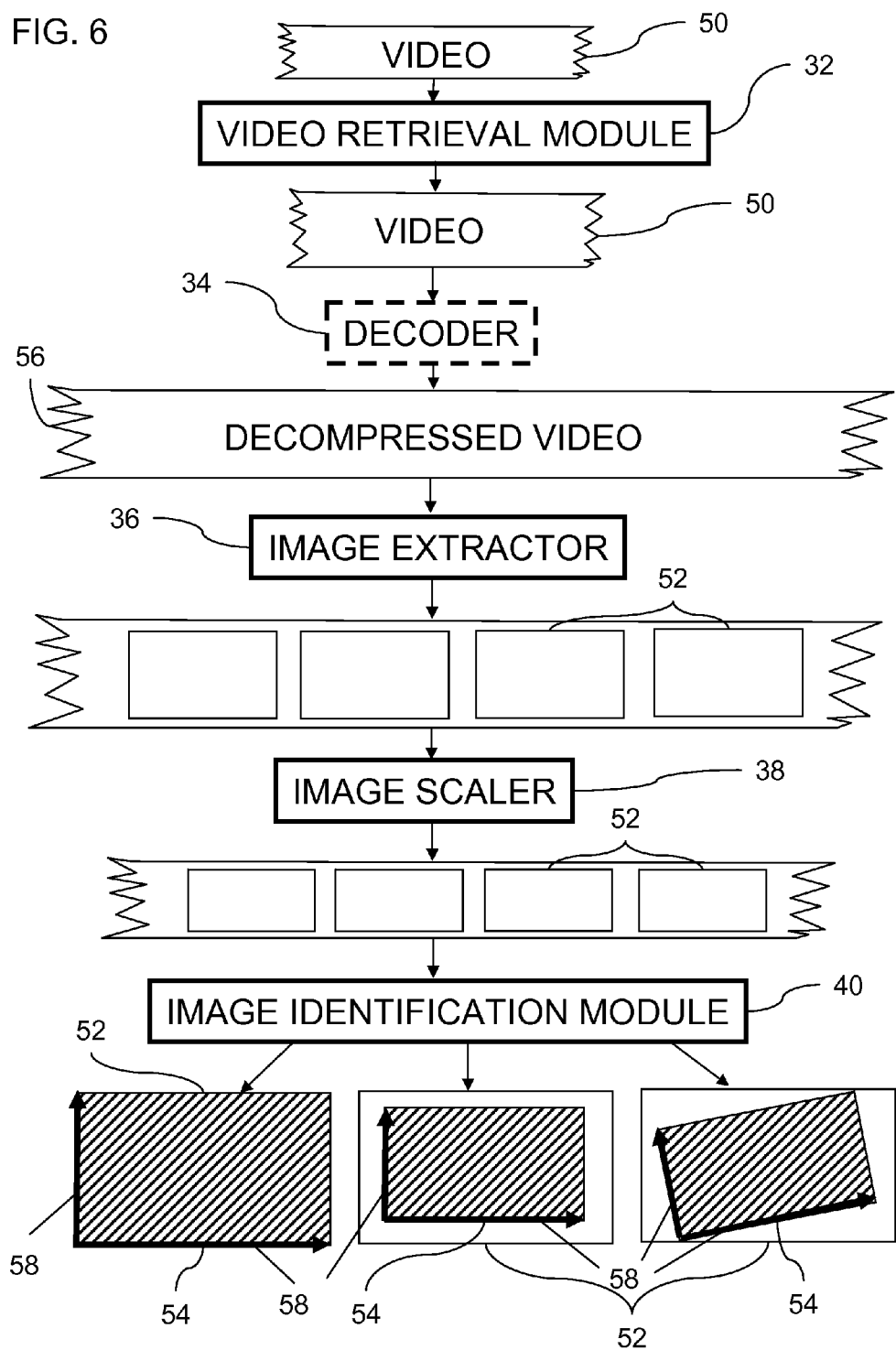
FIG. 6 is a partly pictorial, partly block diagram view showing preparatory steps in the creation of a video signature in the sub-system of FIG. 5.

Reference is now made to FIG. 6, which is a partly pictorial, partly block diagram view showing preparatory steps in the creation of a video signature in the video signature creation sub-system 12 of FIG. 5.

The video retrieval module 32 is operative to retrieve a video sequence 50 having a plurality of frames 52. Each of the frames 52 includes an image 54. The video sequence 50 may include all of a content item, such as a movie, or only part of the content item. It is also possible that some of the original frames 52 of the content item may have been dropped.

The video sequence 50 may be retrieved from a local database or other suitable source such as from a server via the Internet.

Typically, all the available frames 52 of the content item are used to create the video signature, so that any portion of a test video may be analyzed and compared to the created video signature in order to determine if the test video is represented by the video signature or not.

If the video sequence 50 is compressed and/or encoded, the video sequence 50 is uncompressed and/or decoded by the decoder 34 to yield uncompressed video 56.

The image extractor 36 de-interlaces the frames 52 if required, yielding progressive frames. The image extractor 36 is also operative to extract the luminance and chrominance components of the image 54 of each of the frames 52 so that the motion analysis module 44 (FIG. 5) can calculate motion vectors (described in more detail with reference to FIGS. 8-10) in a black and white domain based on the luminance component. The luminance and chrominance components are typically extracted by performing a linear transform in the RGB domain.

The image scaler 38 is operative to resize the frames 52 to a predefined resolution, for example, but not limited to, 176 by 120 pixels, generally in order to simplify calculation of the components of the video signature without compromising the quality (uniqueness) of the video signature. For example, if the pre-scaled frames 52 include 704 by 480 pixels, the frames 52 are scaled by one sixteenth to 176 by 120 pixels. However, it will be appreciated by those ordinarily skilled in the art that the frames 52 can be scaled to any suitable size in order to simplify calculation of the components of the video signature without compromising the uniqueness of the video signature.

The image identification module 40 is operative to: identify the images 54 within the frames 52; and determine a measurement of a size, position and orientation for each of the images 54. The image identification is typically performed as the images 54 may not be positioned and sized consistently among the frames 54 of the video sequence 50 and especially between different video sequences of the same movie, for example. The random positioning of the images 54 within the frames 52 may be unintentional or it may be intentional to avoid a pirate video from being identified via automatic identification or for formatting reasons for example, but not limited to, a 16:9 movie formatted in a 4:3 frame. In some cases the image 54 may be rotated.

The size, position and orientation for each of the images 54 in the frames 52 are defined by a set of orthogonal vectors, called dimension vectors 58.

The dimension vectors 58 are typically based on the first real changeable pixels at the bottom and left side of the image. In other words, the dimension vector 58 parallel to the bottom of the image 54 defines the first bottom non-black active line of the image 54. So for example, a 16:9 format video in a 4:3 frame should have the dimension vector 58 parallel to the bottom of the image 54 at the position where the 16:9 video starts and not at the edge of the 4:3 frame.

The dimension vectors 58 are likely to be the same for a complete video sequence. Therefore, it may not be necessary to perform the identification of the images 54 within the frames 52 and determining the dimension vectors 58 for every frame 52. The dimension vectors 58 may be determined periodically for a video sequence, for example, but not limited to, every 25-200 frames. However, It will be appreciated by those ordinarily skilled in the art that the dimension vectors 58 may be determined for every frame 52 or only once at the beginning of the video sequence 50.

It will be appreciated by those ordinarily skilled in the art that the size, position and orientation of each of the images 54 in the frames 52 may be defined in any suitable way, for example, but not limited to, by the coordinates of the corners of the image 54.

Figure 7:
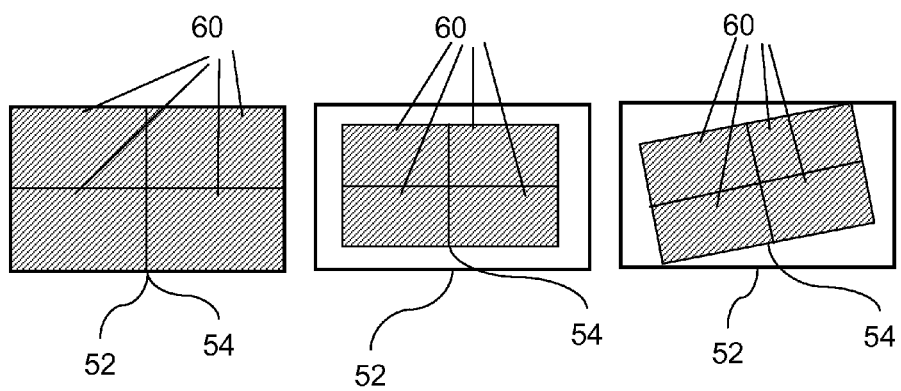
FIG. 7 is a partly pictorial, partly block diagram view of image regions being defined by the sub-system of FIG. 5.

Reference is now made to FIG. 7, which is a partly pictorial, partly block diagram view of image regions 60 being defined by the video signature creation sub-system 12 of FIG. 5.

The region definition module 42 (FIG. 5) is operative to define the image regions 60 for the image 54 of each of the frames 52, such that the image regions 60 occupy the same portions of the image 54 for each of the frames 52. In other words, even if the images 54 are different sizes, positions and/or orientations within the frames 52, the image regions 60 occupy the same portions of the frames 52. For example, if one of the image regions 60 is defined as the bottom left quadrant of the images 54, then the image region 60 occupies the bottom left quadrant of all of the images 54 irrespective of the size, position and/or orientation of the images 54 within the frames 52.

The images 54 may include any number of image regions 60. Using only two image regions 60 per image 54 is possible, but the resulting video signature may not be unique. Using three or four image regions 60 per image 54 should provide better results for the resulting video signature. Using four image regions 60 arranged as quadrants in the images 54 provides a better geometrical basis for calculating the components of the signature as will be seen below. It will be appreciated by those ordinarily skilled in the art that using more than four image regions 60 per image 54 is also possible.

The image regions 60 typically cover the whole of each of the images 54, but it will be appreciated by those ordinarily skilled in the art that the image regions 60 may only cover part of each image 54.

The following is an example of how one of the images 54 may be divided into four image regions 60. Assuming that the image 54 occupies the whole of the frame 52 and has a size of 176 by 120 pixels, and the image 54 includes 8 by 8 pixel blocks, then the image 54 includes 330 blocks (22 blocks by 15 blocks). So, if the image 54 is divided into four image regions 60, there may be two image regions 60 of 82 blocks each, and two image regions 60 of 83 blocks each.

Figure 8:
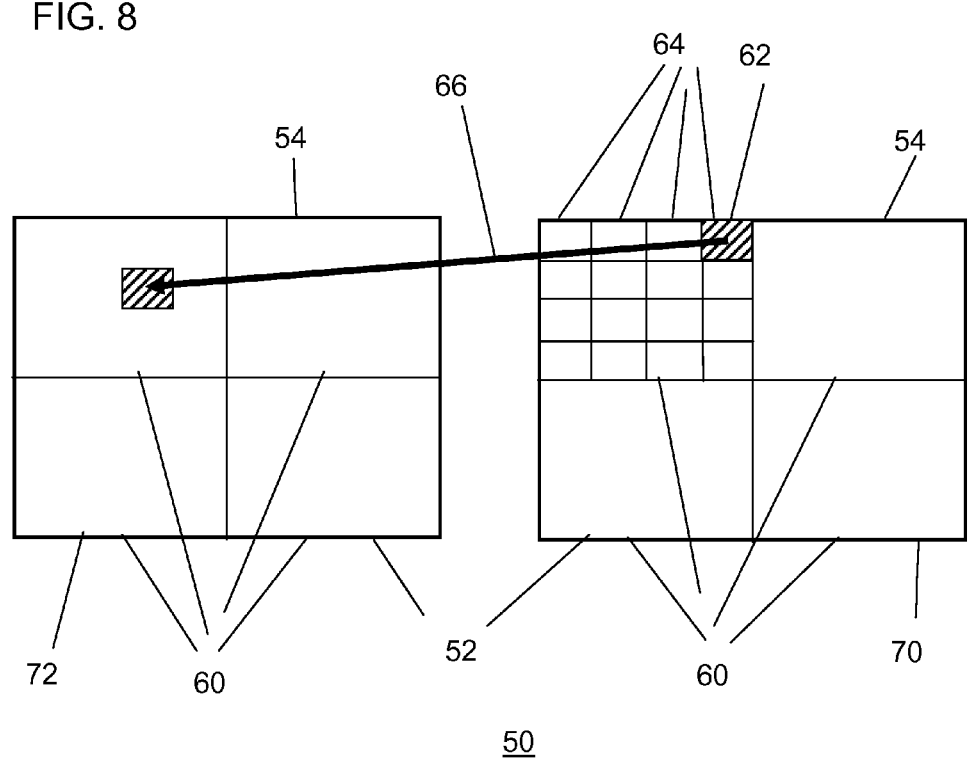
FIG. 8 is a partly pictorial, partly block diagram view showing motion vector calculation for a sub-region of one of the image regions of an image in the sub-system of FIG. 5.

Reference is now made to FIG. 8, which is a partly pictorial, partly block diagram view showing motion vector calculation for a sub-region 62 of one of the image regions 60 of one of the images 54 in the sub-system 12 of FIG. 5.

Each of the image regions 60 includes a plurality of sub-regions 64. The sub-regions 64 are typically blocks of 8 by 8 pixels, 16 by 16 pixels or 32 by 32 pixels or any other suitable size block of pixels.

The motion analysis module 44 (FIG. 5) is operative to calculate a motion vector 66 for each of the sub-regions 64 (only four of the sub-regions 64 are labeled for the sake of clarity) of each of the image regions 60 of each of the frames 52 by comparison to the image 54 of another one of the frames 52. For clarity the frames 52 and the images 54 are shown as being the same size. Only one motion vector 66 is shown in FIG. 8. The motion vector 66 is a measurement of motion of an element in one frame 52 as compared to another frame 52. Each sub-region 64 is typically compared to a previous frame 52 in the video sequence 50, but each sub-region 64 could also be compared to a future frame 52 in the video sequence 50. Each motion vector 66 has a direction of motion and a magnitude of motion. FIG. 8 shows an image of the sub-region 62 of a frame 70 being compared to the image 54 a previous frame 72.

Each motion vector 66 can be calculated using any suitable method of motion vector calculation. However, it may be advantageous to calculate each motion vector 66 according to a pre-defined search radius and accuracy.

Figure 9:
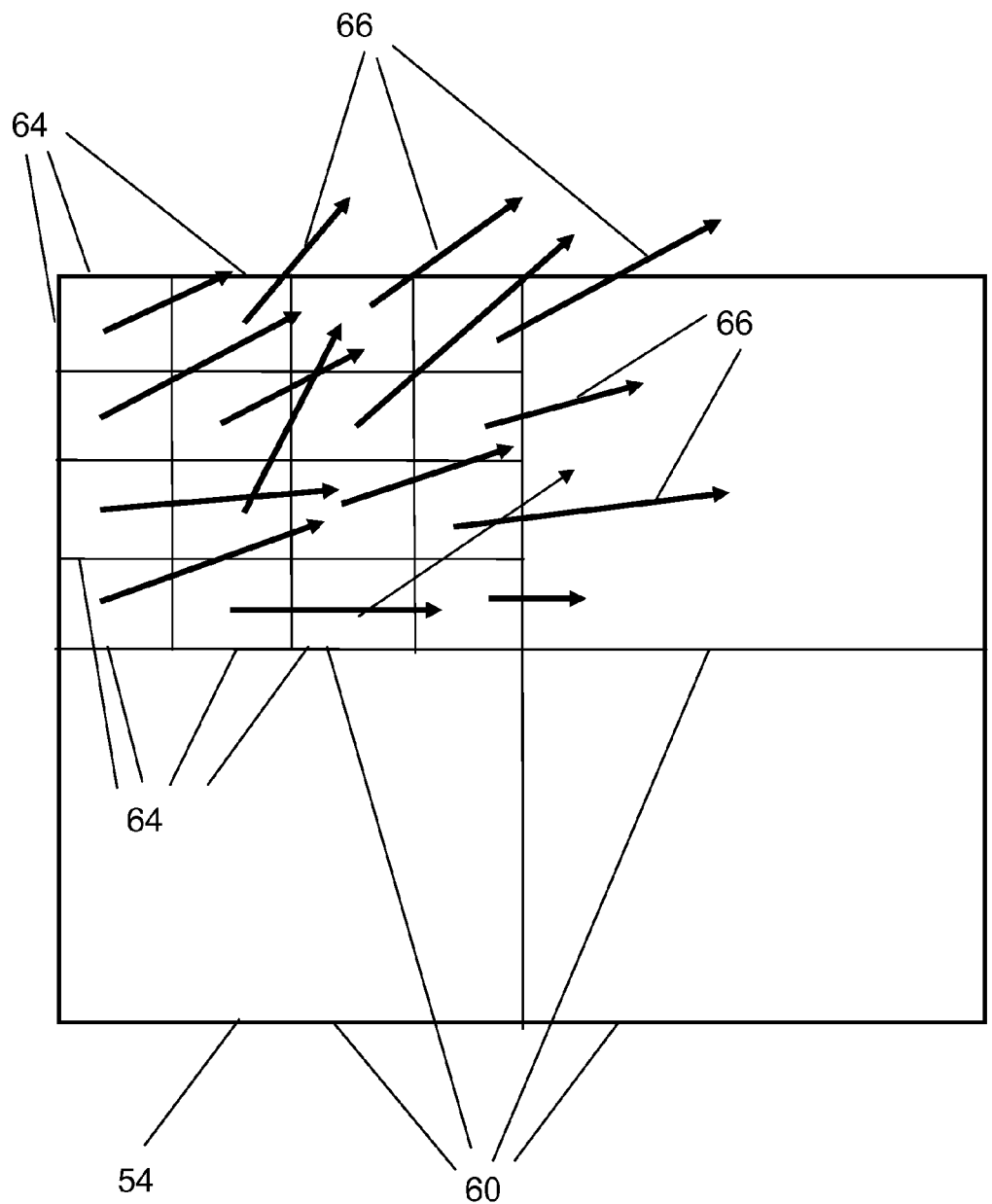
FIG. 9 is a partly pictorial, partly block diagram view showing a plurality of motion vectors for each of the sub-regions of the image region of FIG. 8.

Reference is now made to FIG. 9, which is a partly pictorial, partly block diagram view showing a plurality of the motion vectors 66 for each of the sub-regions 64 of one of the image regions 60 of FIG. 8. The motion vectors 66 are calculated for each of the sub-regions 64 for each of the image regions 60 of each image 54. For the sake of clarity only some of the motion vectors 66 and some of the sub-regions 64 have been labeled in FIG. 9.

Figure 10:
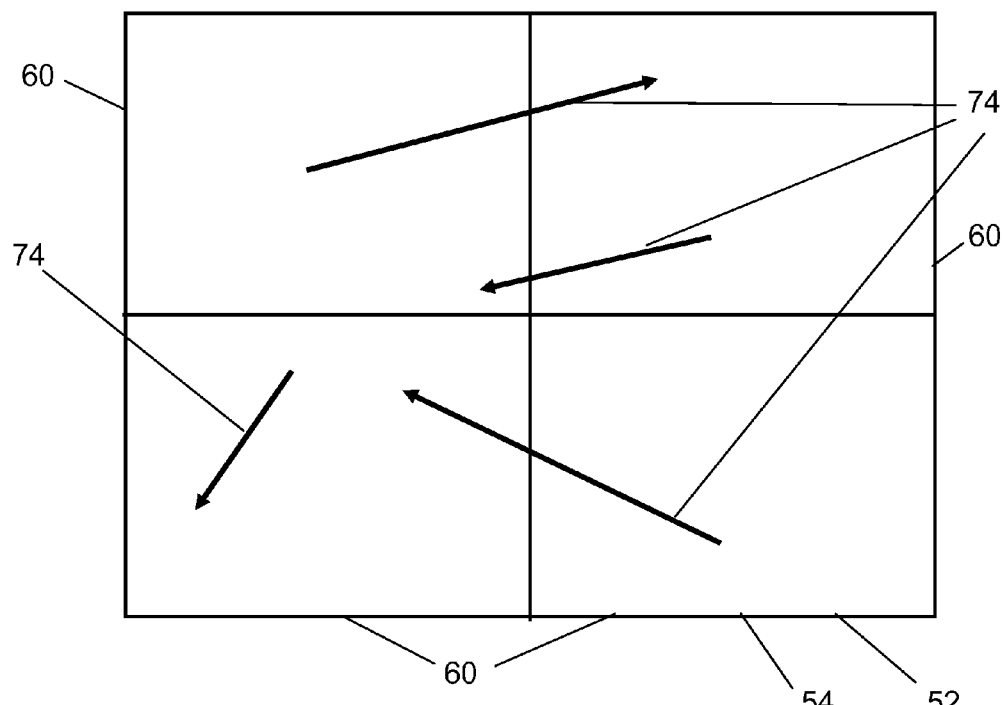
FIG. 10 is a partly pictorial, partly block diagram view showing an average motion vector for each of the image regions of the image of FIG. 8.

Reference is now made to FIG. 10, which is a partly pictorial, partly block diagram view showing an average motion vector 74 for each of the image regions 60 of the image 54 of FIG. 8.

The motion vectors 66 (FIG. 9) calculated for each sub-region 64 are averaged by the motion analysis module 44 (FIG. 5) for each image region 60 of each frame 52, yielding the average motion vector 74 for each image region 60 of each frame 52. Each average motion vector 74 has a direction of motion and a magnitude of motion. For simplicity, the frame 52 and the image 54 are shown as being the same size.

Therefore, by averaging the motion vectors 66 (FIG. 9), the motion analysis module 44 is operative to calculate the average motion vectors 74, such that one of the average motion vectors 74 is calculated for each image region 60 of each frame 52 by comparison to the image 54 of another frame 52.

Figure 11:
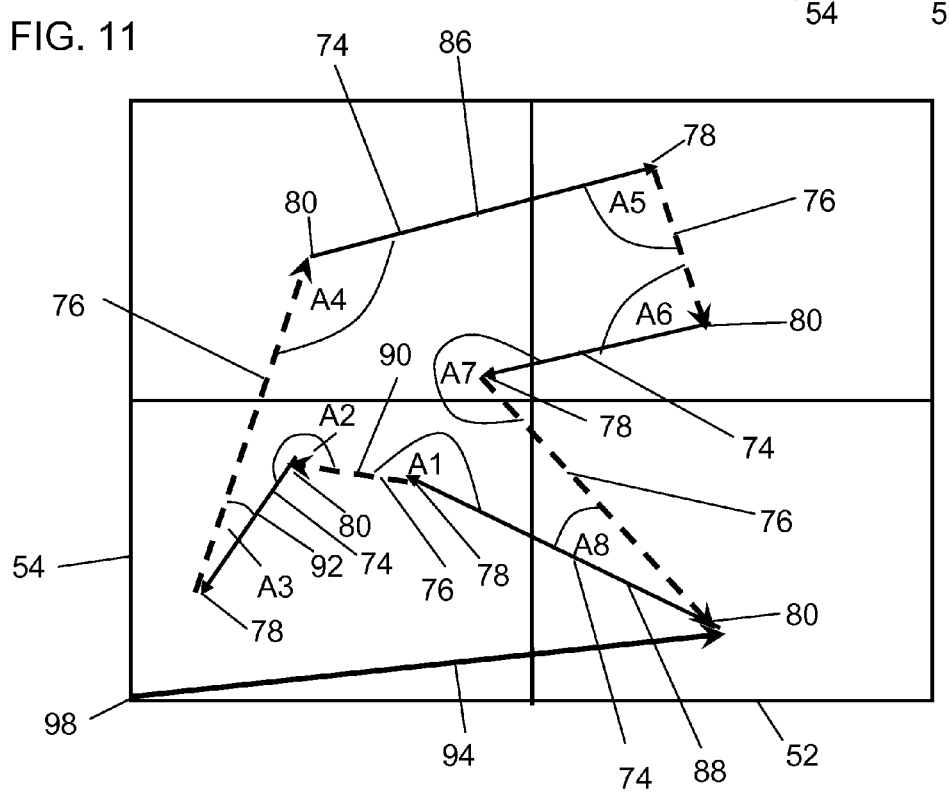
FIG. 11 is a partly pictorial, partly block diagram view showing the motion vectors of FIG. 10 connected by connecting vectors.

Reference is now made to FIG. 11, which is a partly pictorial, partly block diagram view showing the motion vectors 74 of FIG. 10 connected by a plurality of connecting vectors 76 in the frame 52. For simplicity, the frame 52 and the image 54 are shown as being the same size.

Each motion vector 74 has a head 78 and a tail 80. The head 78 and the tail 80 are defined by the direction of motion described by the average motion vector 74 such that that the direction from the tail 80 to the head 78 is in the direction of motion. Each connecting vector 76 is connected to the tail 80 of one motion vector 74 and the head 78 of another motion vector 74, so that the connecting vectors 76 are connecting the motion vectors 74 together in each frame 52 forming a closed circuit 86.

Optionally, the motion analysis module 44 (FIG. 5) is operative to determine a plurality of angles so that a set of angles (A1, A2, A3, A4, A5, A6, A7, A8) is defined for each of the frames 52. Each set of angles (A1, A2, A3, A4, A5, A6, A7, A8) is defined by the motion vectors 74 and the connecting vectors 76 of the frame 52, such that each angle in the set of angles (A1, A2, A3, A4, A5, A6, A7, A8) is defined by one motion vector 74 and one connecting vector 76. Typically, each of the angles (A1, A2, A3, A4, A5, A6, A7, A8) is an angle subtended by one average motion vector 74 and one connecting vector 76 on the inside of the closed circuit 86. However, the angles (A1, A2, A3, A4, A5, A6, A7, A8) could be defined in a suitable way, for example, but not limited to, on the outside of the closed circuit 86 or by the acute angles or by the obtuse angles subtended.

The first angle A1 is defined as the angle between a first average motion vector 88 and a first connecting vector 90 which connects the first average motion vector 88 and a second average motion vector 92. The second angle A1 is defined as the angle between the second average motion vector 92 and the next connecting vector 76. The remaining angles are similarly defined so that the angles progress from the first average motion vector 88 around the closed circuit 86 until all the angles are defined.

The decision of how the angles are defined by the average motion vectors 74 and the connecting vectors 76 is arbitrary. However, it will be appreciated that the definition of how the angles are defined should be consistent for all frames and all videos. Similarly, the angles in the set of angles should be ordered consistently with respect to the average motion vectors 74 for each of the frames 52 and all videos.

The position of the tail 80 of the first average motion vector 88 is defined by a reference point vector 94 starting at an origin 98 of the image 54.

It may be possible to define a set of the angles without using the connecting vectors 76 by simply extending the average motion vectors 74 until the average motion vectors 74 intersect and define a set of angles between the average motion vectors 74.

As will be discussed with reference to FIG. 21, the set of angles (A1, A2, A3, A4, A5, A6, A7, A8) is used when comparing the video signature with a test video sequence. If the set of angles is not determined by the video signature creation sub-system 12 prior to creation of the video signature, the set of angles (A1, A2, A3, A4, A5, A6, A7, A8) can be determined from data defining the average motion vectors 74 and the connecting vectors 76 in the video signature when comparing the video signature with the test video sequence.

The motion analysis module 44 (FIG. 5) typically includes a buffer (not shown) to store the frames 52 used for comparison purposes when calculating the motion vectors 66 (FIG. 9)

and the average motion vectors 74 as well as other working values and the angles (A1, A2, A3, A4, A5, A6, A7, A8), if necessary.

Figure 12:
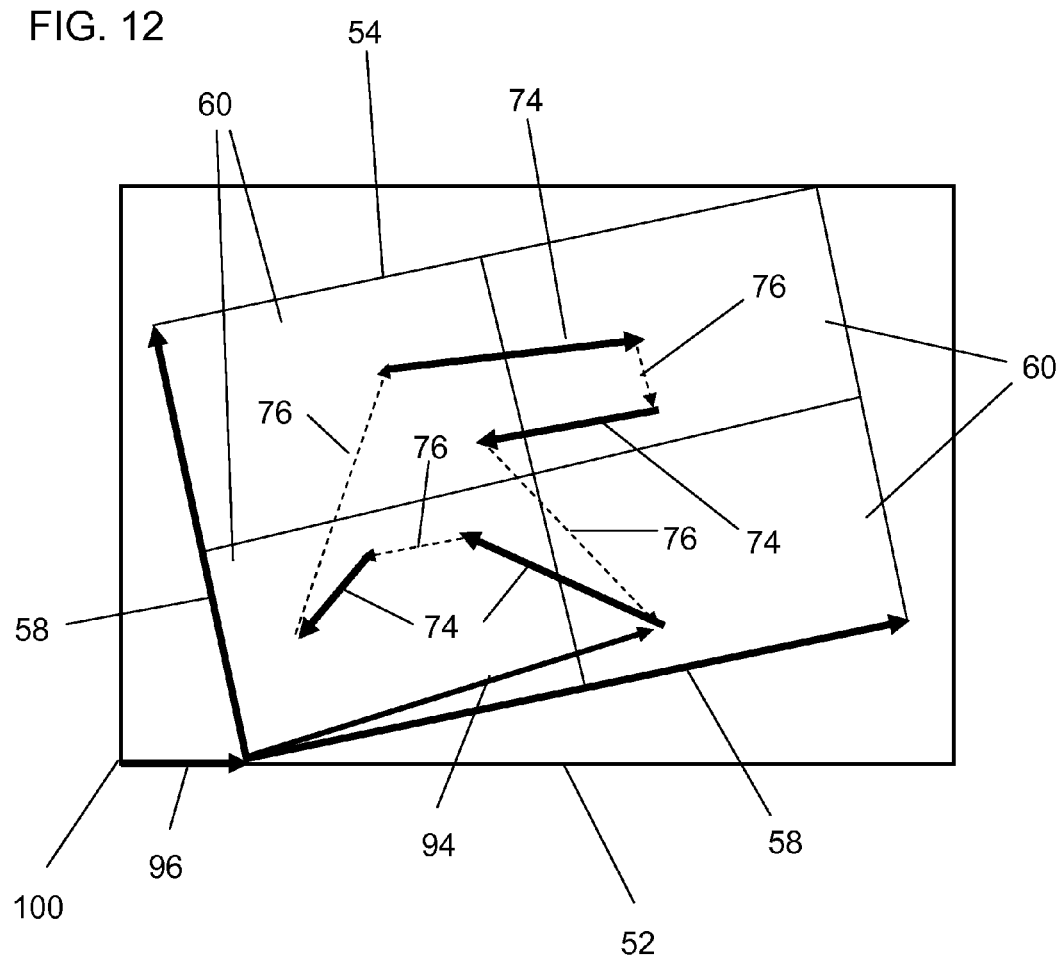
FIG. 12 is a partly pictorial, partly block diagram view showing the motion vectors of FIG. 11 with the addition of dimension vectors.

Reference is now made to FIG. 12, which is a partly pictorial, partly block diagram view showing the average motion vectors 74 of FIG. 11 with the addition of the dimension vectors 58.

In FIGS. 8-11, the frames 52 and the images 54 are shown as being the same size for simplicity. However, the images 54 may be smaller than the frames 52 and possibly rotated as well. The size and orientation of the image 54 in the frames 52 is defined by the dimension vectors 58 described with reference to FIG. 6. The reference point vector 94, described in FIG. 11 is also shown.

Another reference point vector 96 defines the position of the tails of the dimension vectors 58 with respect to an origin 100 of the frame 52. The reference point vector 96 is typically defined by the image identification module 40 (FIG. 6).

Figure 13:
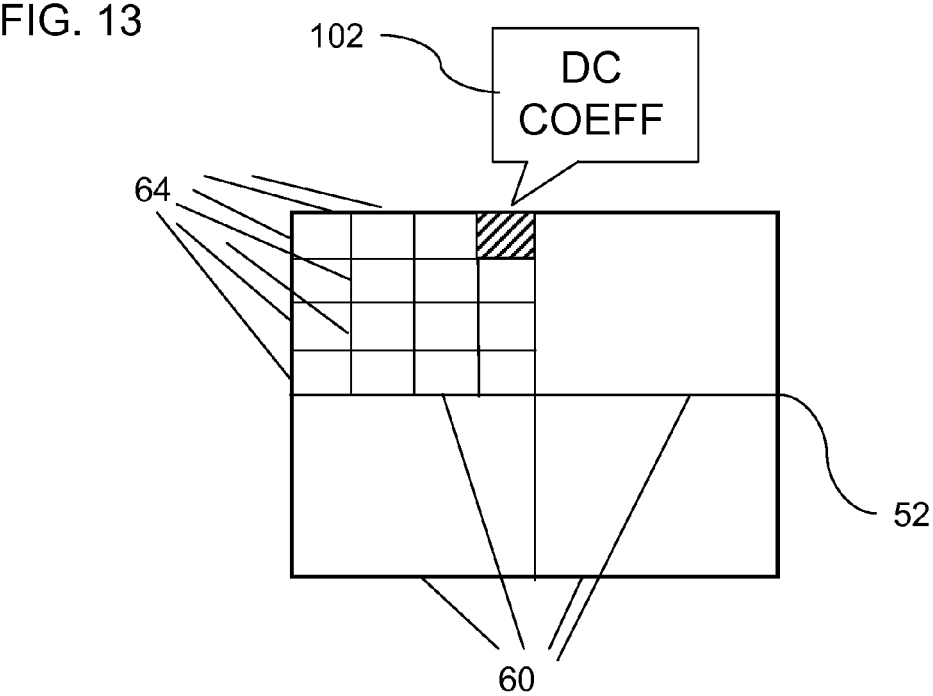
FIG. 13 is a partly pictorial, partly block diagram view showing the determination of a DC coefficient for the sub-region of FIG. 8.

Reference is now made to FIG. 13, which is a partly pictorial, partly block diagram view showing the determination of a DC coefficient 102 for the sub-region of FIG. 8.

The DCT module 46 (FIG. 5) is operative to perform a discrete cosine transform for each sub-region 64 (only some labeled for the sake of clarity) of each image region 60 of each frame 52. Each of the DCT transforms includes a DC component 102 and typically a multiplicity of AC components. Therefore, the DCT module 46 yields a plurality of DC coefficients 102 for each of the image regions 60 for each of the frames 52. Only one DC coefficient 102 is shown for the sake of clarity.

The DCT operation may be based on a lookup table for better performance. However, it will be appreciated by those ordinarily skilled in the art that any suitable method of performing a DCT can be used.

The DC component of each DCT operation is selected for further processing described with reference to FIG. 14, and the AC components are typically discarded. The reason the DC component is selected is because the DC component represents the most common part of the sub-region 64 and the DC component is typically not affected by noise, whereas the AC components are typically affected by noise.

Figure 14:
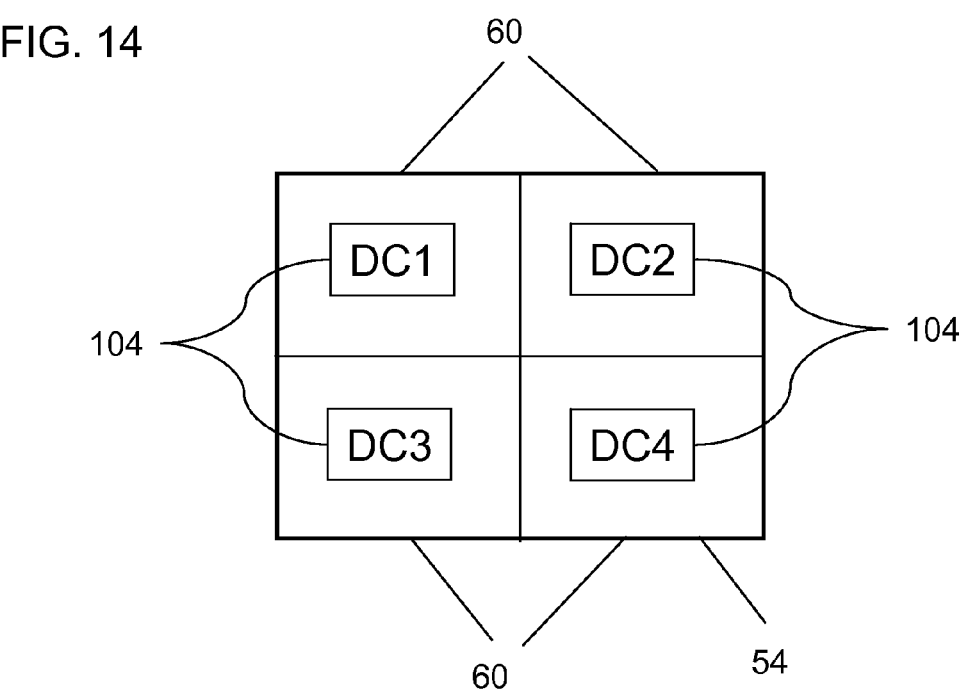
FIG. 14 is a partly pictorial, partly block diagram view showing an average DC coefficient for each of the image regions of the image of FIG. 8.

Reference is now made to FIG. 14, which is a partly pictorial, partly block diagram view showing a plurality of average DC coefficients 104 (DC1, DC2, DC3, DC4), one DC coefficient 104 for each of the image regions 60 of the image 54 of FIG. 8.

For each image region 60, the DCT module 46 (FIG. 5) is operative to determine a value based on the DC coefficients in the image region 60.

The value is typically an average of the DC coefficients, such as the average DC coefficient 104, or a result of a modulo function operation, for example, but not limited to a modulo addition operation, such as (DCa, DCb, DCc . . . )Mod z, where z is between −1000 and 1000.

Figure 15:
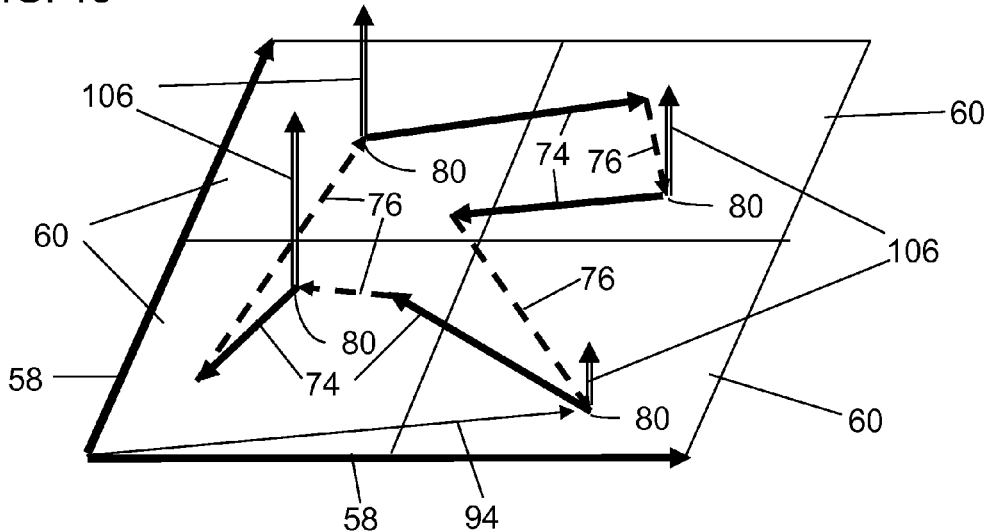
FIG. 15 is a partly pictorial, partly block diagram view showing a plurality of power vectors representing the average DC coefficients of FIG. 15.

Reference is now made to FIG. 15, which is a partly pictorial, partly block diagram view showing a plurality of power vectors 106 representing the average DC coefficients 104 of FIG. 15.

The average DC coefficient 104 for each of the image regions 60 can be represented by the power vectors 106. The magnitude of each of the power vectors 106 is based on the value of the associated average DC coefficient 104. For mathematical and/or presentation convenience the power vectors 106 are shown as being orthogonal to the plane defined by the average motion vectors 74, the connecting vectors 76, the dimension vectors 58 and the reference point vector 94. For mathematical and/or presentation convenience the tail of each of the power vectors 106 is typically defined as being at the same point as the tail 80 of average motion vector 74 for the same image region 60.

Figure 16:
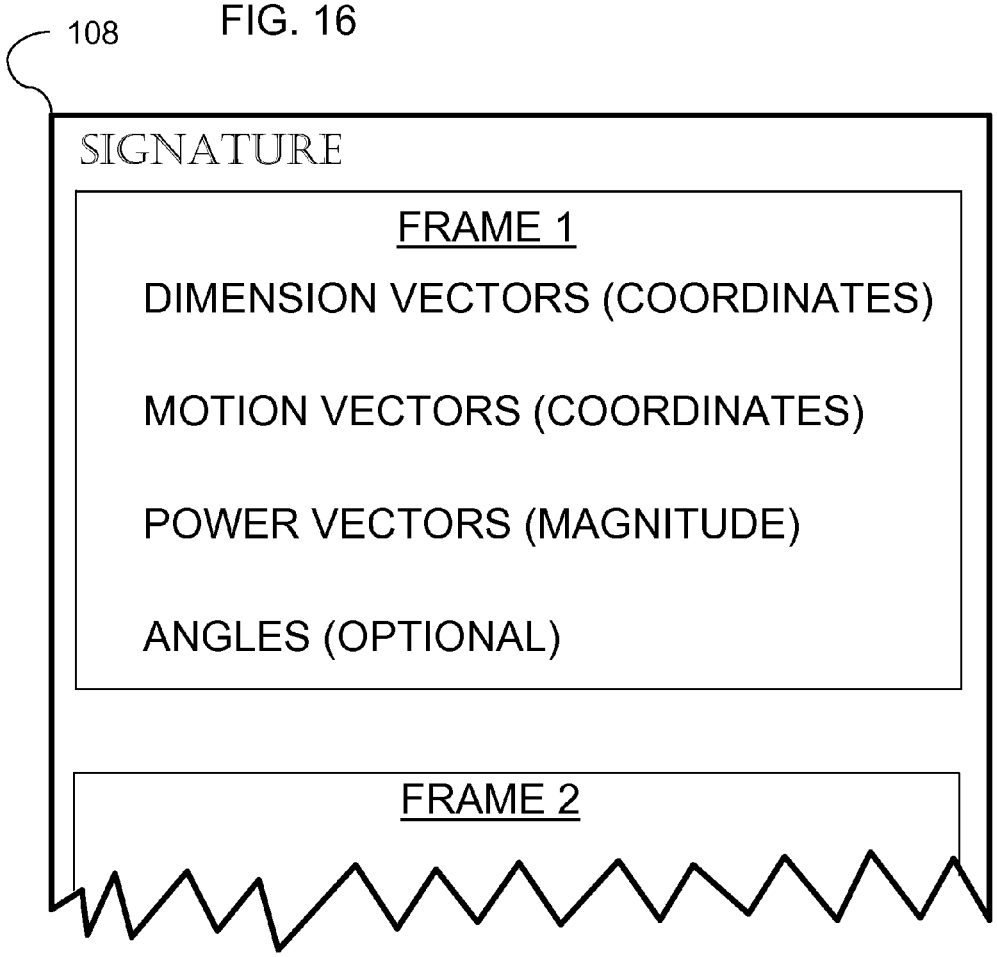
FIG. 16 is a partly pictorial, partly block diagram view of a video signature created by the sub-system of FIG. 5.

Reference is now made to FIG. 16, which is a partly pictorial, partly block diagram view of a video signature 108 created by the video signature creation sub-system 12 of FIG. 5. Reference is also made to FIG. 12.

The signature creation module 48 (FIG. 5) is operative to create the video signature 108 including data indicative of the direction of motion and the magnitude of motion for each of the image regions 60 of each of the frames 52 (FIG. 12).

The data indicative of the direction and magnitude of motion is typically defined by the average motion vectors 74. As the images 54 may be smaller than the frames 52, and possibly rotated as well, the reference point vector 96, the dimension vectors 58 and the reference point vector 94 are also needed to define the direction and magnitude of the motion.

In addition, the reference point vector 96, the dimension vectors 58, the reference point vector 94 and the connecting vectors 76 also enable the position of the average motion vectors 74 to be defined.

If the coordinates of the heads and tails of the average motion vectors 74 are included in the video signature 108, then the reference point vector 94 is not needed in the video signature 108. Additionally, the coordinates of the heads and tails of the average motion vectors 74 also define the heads and tails of the connecting vectors 76.

Additionally, if the coordinates of the heads and tails of the dimension vectors 58 are included in the video signature 108, then the reference point vector 96 is not needed in the video signature 108.

Optionally, the signature creation module 48 (FIG. 5) is operative to create the video signature including the set of angles (A1, A2, A3, A4, A5, A6, A7, A8) (FIG. 11) for each of the frames 52. As described above with reference to FIG. 11, the angles in the set of angles are ordered consistently with respect to the motion vectors 74 for each of the frames 52. A reason why the angles should be ordered consistently in the video signature 108 is so that when test video sequences are compared to the video signature 108, the order of the angles reduces mismatches between the video signature 108 and test video sequences.

Optionally, the angles (A1, A2, A3, A4, A5, A6, A7, A8) are not included in the video signature 108. In such a case, the angles are calculated from the average motion vectors 74 and the connecting vectors 76 when the video signature 108 needs to be compared to a test video sequence, described in more detail with reference to FIG. 21.

The signature creation module 48 (FIG. 5) is operative to create the video signature 108 including the average DC coefficients 104 (FIG. 14), typically in the form of the magnitude of the power vectors 106 (FIG. 15) for each of the image regions 60 of each of the frames 52.

As mentioned above, the dimension vectors 58 are typically included in the video signature 108 providing a measurement of the size, position and orientation of the image 54.

The video signature 108 can include motion and DC coefficient data for as many or as few frames 52 as required. However, it is estimated that using a video sequence of fifty or more frames 52 provides a better quality signature.

Figure 17:
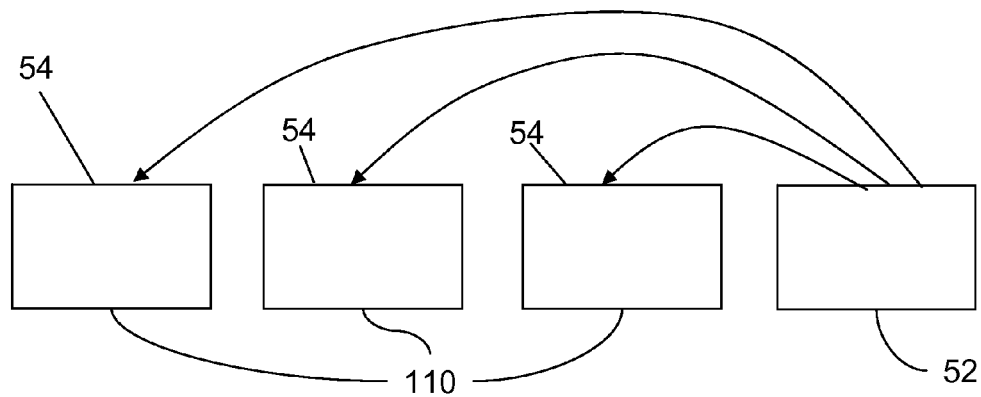
FIG. 17 is partly pictorial, partly block diagram view showing calculation of motion vectors with respect to a plurality of adjacent frames using the sub-system of FIG. 5.

Reference is now made to FIG. 17, which is partly pictorial, partly block diagram view showing calculation of motion vectors with respect to a plurality of adjacent frames 110 using the video signature creation sub-system 12 of FIG. 5.

In FIGS. 8 and 9, the motion vectors 66 were calculated by comparison to one closest neighboring frame 72, yielding a single set of: average motion vectors 74 (FIG. 10); connecting vectors 76 (FIG. 11); and angles (A1, A2, A3, A4, A5, A6, A7, A8) (FIG. 11).

However, due to dropped frames (typically in the videos being compared with the video sequence 50) and different frame rates, it is desirable to have multiple sets of: average motion vectors 74 (FIG. 10); connecting vectors 76 (FIG. 11); and angles (A1, A2, A3, A4, A5, A6, A7, A8) (FIG. 11), for each frame 52, by comparing the frame 52 to two or three or more adjacent frames 110 yielding the multiple sets of data.

Therefore, the motion analysis module 44 (FIG. 5) is operative to calculate the motion vectors 66 (FIGS. 8 and 9) for each of the sub-regions 64 (FIG. 9) of each of the frames 52, by comparison with the adjacent frames 110. So for example, the image of each of the sub-regions 64 (FIG. 9) is compared to the images of two or three or more adjacent frames 110 yielding a multiplicity of motion vectors 66 (FIG. 9) for each of the sub-regions 64 (FIG. 9).

Therefore, the motion analysis module 44 (FIG. 5) is operative to calculate the motion vectors 74 (FIG. 10), such that a multiplicity of the motion vectors 74 are calculated for each of the image regions 60 (FIG. 10) of each of the frames 52 by comparison to the images 54 of other ones of the frames 110, thereby yielding multiple sets of: average motion vectors 74 (FIG. 10); connecting vectors 76 (FIG. 11); and angles sets (A1, A2, A3, A4, A5, A6, A7, A8) (FIG. 11), for each frame 52.

Figure 18:
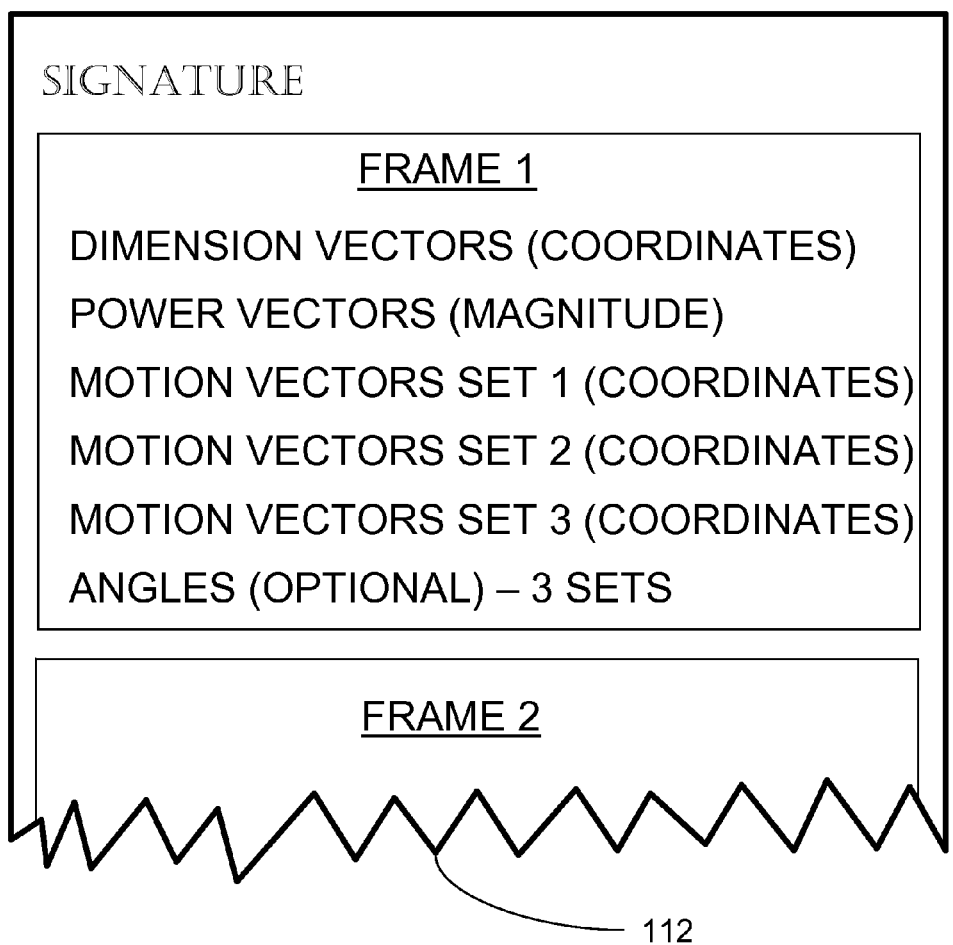
FIG. 18 is a partly pictorial, partly block diagram view of another video signature created by the sub-system of FIG. 5.

Reference is now made to FIG. 18, which is a partly pictorial, partly block diagram view of another video signature 112 created by the video signature creation sub-system 12 of FIG. 5.

The video signature 112 is substantially the same as the video signature 108 of FIG. 16, except that the video signature 112 includes for each frame 52 (FIG. 6), multiple sets of the average motion vectors 74 (FIG. 15) and optionally multiple sets of the angle sets (A1, A2, A3, A4, A5, A6, A7, A8) (FIG. 11). Multiple sets of the connecting vectors 76 (FIG. 15) and the reference point vector 94 (FIG. 15) may also be required depending on how the average motion vectors 74 are defined in the video signature 112 as explained with reference to FIG. 16.

Figure 19:
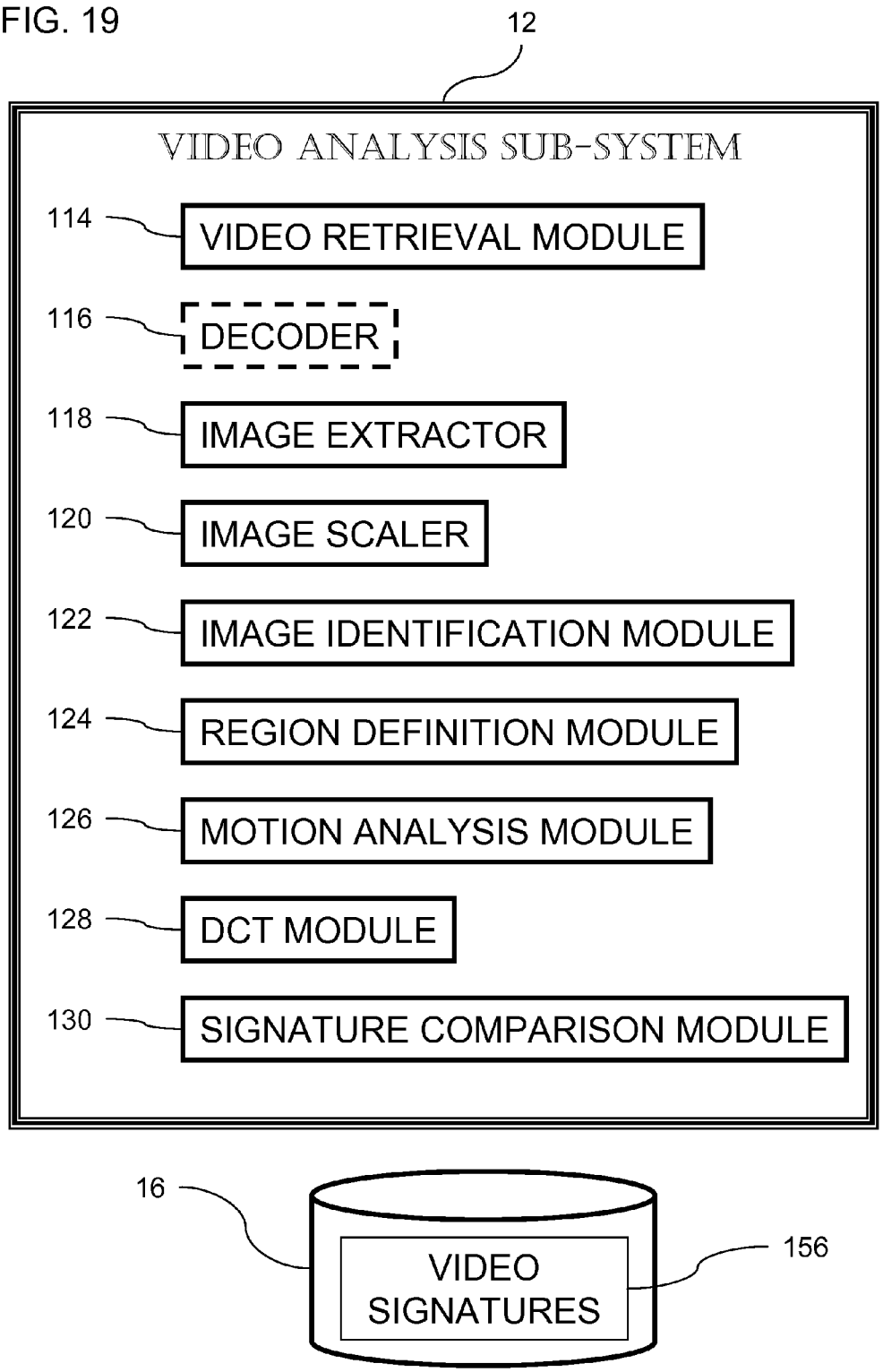
FIG. 19 is a block diagram view of a video analysis sub-system of the system of FIG. 1.
Figure 20:
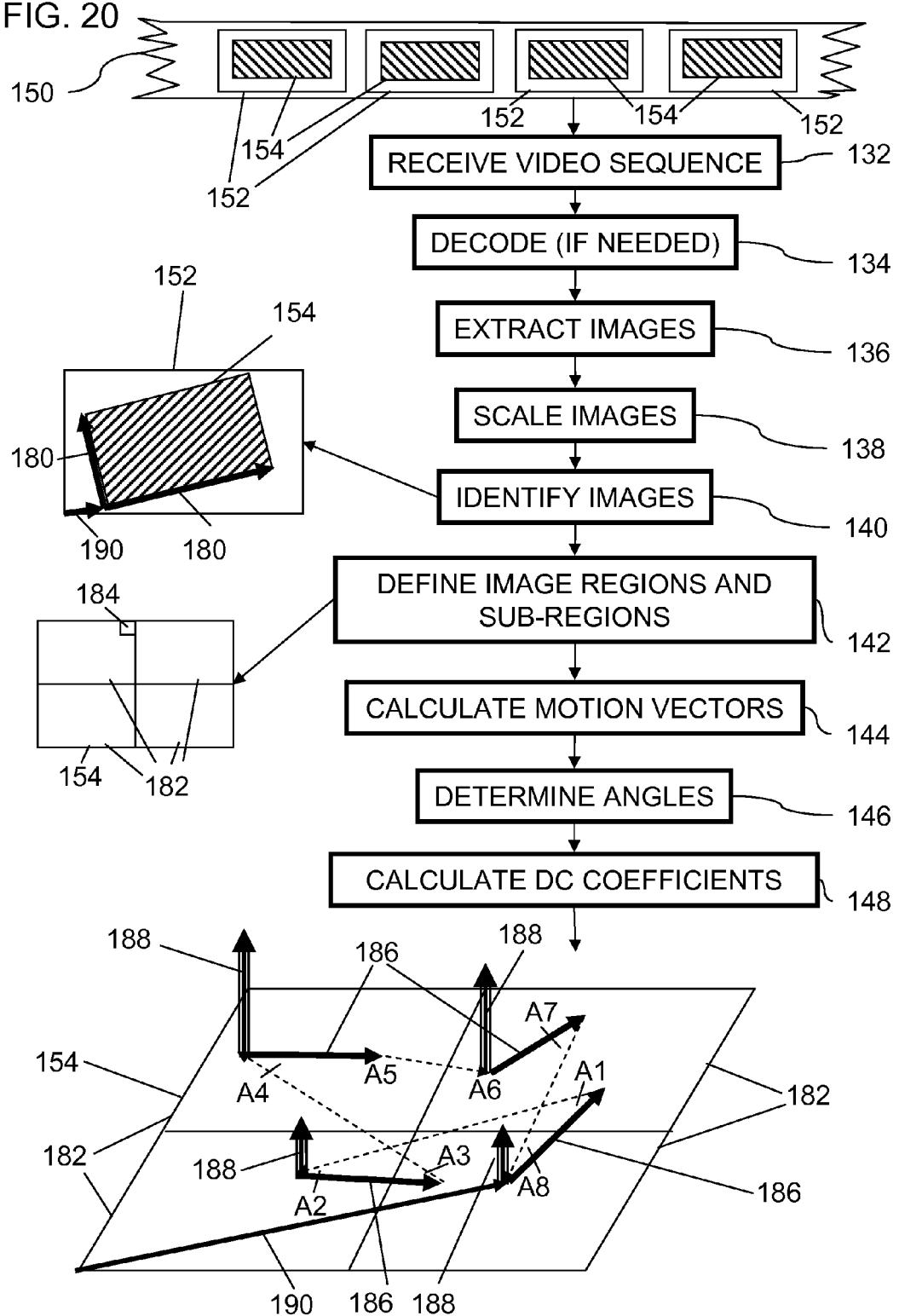
FIG. 20 is a partly pictorial, partly block diagram view showing steps in a method of data extraction in the sub-system of FIG. 19.

Reference is now made to FIGS. 19 and 20. FIG. 19 is a block diagram view of the video analysis sub-system 14 of the system 10 of FIG. 1. FIG. 20 is a partly pictorial, partly block diagram view showing steps in a method of data extraction in the video analysis sub-system 14 of FIG. 19.

The video analysis sub-system 14 includes a plurality of operationally connected modules including: a video retrieval module 114, a decoder 116, an image extractor 118, an image scaler 120, an image identification module 122, a region definition module 124, a motion analysis module 126, a DCT module 128, and a signature comparison module 130.

The video retrieval module 114, the decoder 116, the image extractor 118, the image scaler 120, the image identification module 122, the region definition module 124, the motion analysis module 126 and the DCT module 128 have substantially the same functionality as the video retrieval module 32, the decoder 34, the image extractor 36, the image scaler 38, the image identification module 40, the region definition module 42, the motion analysis module 44 and the discrete cosine transform (DCT) module 46, respectively.

It will be appreciated by those ordinarily skilled in the art that the modules of the video analysis sub-system 14 can be the same modules as used by the video signature creation sub-system 12.

The video retrieval module 114, the decoder 116, the image extractor 118, the image scaler 120, the image identification module 122, the region definition module 124, the motion analysis module 126 and the DCT module 128 take one or more parts of a test video sequence 150 having a plurality of frames 152, each of the frames 152 including an image 154, and process the part(s) of the test video 150 in substantially the same way as the video sequence 50 of FIG. 6, as described with reference to FIGS. 6-15. Each part of the test video sequence 150, processed by the video analysis sub-system 14 for comparison with one or more video signatures 156, typically includes at least fifty frames 152. More than one part of the test video 150 is typically compared to the video signature 156 (say 15 to 30 minutes apart, by way of example only) so that a trailer or promotional video is not identified as a complete video, for example. It will be appreciated that the whole test video sequence 150 does generally not need to be compared to the video signatures 156. However, the whole test video sequence 150 could be compared to the video signatures 156, if required or desired. The video signatures 156 are typically, but not necessarily, created using the process described with reference to FIGS. 5-18.

The video retrieval module 114 is operative to retrieve the test video sequence 150 (block 132).

If the frames are compressed and/or encoded, the decoder 116 is operative to uncompress/decode the frames 152 yielding uncompressed video frames (block 134).

The image extractor 118 is operative to de-interlace the frames 152 if required, yielding progressive frames.

The image extractor 118 is operative to extract a luminance component of the image 154 of each of the frames 152 so that the motion analysis module 126 is operative to calculate motion vectors in a black and white domain based on the luminance component (block 136).

The image scaler 120 is operative to resize the frames 152 to a predefined resolution (block 138).

The image identification module 122 is operative to: identify the image 154 within one or more of the frames 152; and determine a measurement of a size, position and orientation of the image 154, typically by way of a plurality of orthogonal dimension vectors 180 (block 140).

The steps of blocks 132-140 are described in more detail with reference to FIG. 6.

The region definition module 124 is operative to define a plurality of image regions 182 for the image 154 of each of the frames 152, such that the image regions 182 occupy the same portions of the image 154 for each of the frames 152. A plurality of sub-regions 184 is also defined for each image region 182 (block 142). Only one sub-region 184 is shown for the sake of simplicity. The definition of image regions 182 and sub-regions 184 is described in more detail with reference to FIGS. 7 and 8.

The motion analysis module 126 is operative to calculate a plurality of motion vectors 186, such that one of the motion vectors 186 is calculated for each of the image regions 182 of each of the frames 152 by comparison to the image 154 of another one of the frames 152 (typically the immediately prior frame 152 or the next frame 152), each of the motion vectors 186 having a direction of motion and a magnitude of motion. The motion vectors for each of the image regions 182 are typically determined by averaging a multiplicity of other motion vectors calculated for the sub-regions 184 (block 144). Motion vector calculation is described in more detail with reference to FIGS. 8-10.

The motion analysis module 126 is operative to determine a plurality of angles (A1, A2, A3, A4, A5, A6, A7, A8) including a set of the angles for each of the frames 152 (block 146), described in more detail with reference to FIG. 11.

The DCT module 128 is operative to determine a DC coefficient value for each of the image regions of each of the frames 152 (block 148), typically represented by a plurality of power vectors 188, described in more detail with reference to FIGS. 13-15.

Two reference point vectors 190, corresponding to the reference point vectors 94, 96 described in more detail with reference to FIG. 12, are also determined for the frames 152 of the test video sequence 150.

The signature comparison module 130 is described in more detail with reference to FIG. 21.

Reference is now made to FIG. 21, which is an overview flowchart showing steps in a method of comparing the test video sequence 150 of FIG. 20 with video signature(s) 156 in the video analysis sub-system 14 of FIG. 19. Reference is also made to FIGS. 19 and 20.

As the angle sets of the test video sequence 150 are generally not affected by image rotation or scaling (as long as the aspect ratio is maintained), as a first pass comparison between a part of the test video sequence 150 and the video signature 156, the signature comparison module 130 is operative to compare the angle sets calculated for a part of the test video sequence 150 with the angle sets of the video signature 156 (block 158). If the angle sets are not stored in the video signature 156, the angle sets are first calculated based on the motion vectors as described with reference to FIG. 11.

The angle sets of all the frames 152 of the part of the test video sequence 150 are typically compared to the angle sets of the video signature 156 to determine if the angle sets match.

As described above with reference to FIG. 17, the video signature 156 may include more than one set of angles for each frame 152 and more than one set of motion vectors 186 for each frame 152. Therefore, the test video sequence 150 is compared to all the data sets in the video signature 156 so that if frames have been dropped from the test video sequence 150, a match between the test video sequence 150 and the video signature 156 can still be found, assuming that too many frames have not been dropped.

When the angle sets are compared, corresponding angles within the sets are compared. In other words, A1 of the angle set of the test video sequence 150 is compared with A1 of the angle set of the video signature 156, A2 of the angle set of the test video sequence 150 is compared with A2 of the angle set of the video signature 156 and so on, for the remainder of the angle set.

An angle set of the test video sequence 150 is generally said to "match" an angle set of the video signature 156, if the angles in the angle set of the test video sequence 150 are each within a certain percentage (for example, but not limited to, within about 3%) of the corresponding angles in the angle set of the video signature 156. As corresponding angles are checked, there is generally a very low probability that frame matching is incorrect if all the angles in a set "match".

If the angle sets of the part of the test video sequence 150 do not match the video signature 156 (arrow 164), the angle sets are then compared to another one of the video signatures 156 (block 160).

If the angle sets of the part of the test video sequence 150 "match" the video signature 156 (arrow 166), then the next stage is to check the power vectors 188 of the part of the test video sequence 150 against the video signature 156 (block 162). Therefore, the signature comparison module 130 is operative to compare the power vectors 188, for each image region 182 of each frame 152 with the power vectors 106 (FIG. 15) of the video signature 156.

Typically, a comparison of one of the power vectors 188 with a corresponding one of the power vectors 106 (FIG. 15) is considered a match if the power vector 188 is within a certain percentage (for example, but not limited to, within about 3%) of the power vector 106 (FIG. 15). However, it will be appreciated by those ordinarily skilled in the art that the precision of the match and the precision of the other matches performed by the video analysis sub-system 14 (FIG. 19) depends on the precision of the various parts of the video signature creation sub-system 12 (FIG. 5) and the video analysis sub-system 14 of FIG. 19.

If the power vectors 188 compared do not match the video signature 156 (arrow 168), the test video is compared to another one of the video signatures 156 (block 160).

If the power vectors 188 "match" the video signature 156 (arrow 170), then the next stage is to check the motion vectors 186 of the part of the test video sequence 150 against the video signature 156 (block 172). Therefore, the signature comparison module 130 (FIG. 19) is operative to compare the magnitude of motion of the motion vectors 186 for each of the image regions 182 of each of the frames 152 with the motion vectors 74 (FIG. 15) of the video signature 156.

In order to reduce unnecessary processing, a selection, for example, but not limited to, three or four, of the frames 152 of the test video sequence 150 are compared against the video signature 156 to determine if the motion vectors 186 of the selected frames 152 provide a "match". If there is a "match" for the selection of the frames 152, then the motion vectors 186 of the rest of the frames 152 of the part of the test video sequence 150 are compared with the video signature 156.

As the angle sets for each frame 152 have previously been checked, it is not generally required to check the direction of motion of the motion vectors 186 of the test video sequence 150 against the video signature 156. However, if a more detailed check of the direction of motion is required, the signature comparison module 130 is operative to compare the direction of motion of the motion vectors 186 for each of the image regions 182 of each of the frames 152 with the video signature 156. It may also be advantageous to compare the positioning of the motion vectors 186 of the test video sequence 150 with the video signature 156.

When the motion vectors 186 are represented by the coordinates of the head and tail of the motion vectors 186, then the position, magnitude and direction of motion can all be checked at the same time by comparing the coordinates of the head and tail of the motion vectors 186.

As the images 154 within the frames 152 of the test video sequence 150 may be sized, positioned and/or orientated differently than the images 54 (FIG. 6) within the frames 52 (FIG. 6) of the video 50 (FIG. 6) used to create the video signature 156, the comparison of the motion vectors 186, 74 is typically based on the dimension vectors 58 (FIG. 15) and the dimension vectors 180.

Typically, a comparison of one of the motion vectors 186 (for magnitude or direction or position of the motion vector 186) with a corresponding one of the average motion vectors 74 (FIG. 15) is considered a match if the motion vector 106 is within a certain percentage (for example, but not limited to, within about 3%) of the average motion vector 74. However, it will be appreciated by those ordinarily skilled in the art that the precision of the match and the precision of the other matches performed by the video analysis sub-system 14 depends on the precision of the various parts of the video signature creation sub-system 12 (FIG. 5) and the video analysis sub-system 14.

It will be appreciated that when comparing motion vectors 186 and power vectors 188 of the test video sequence 150 with the video signature 156, the power vector 188 and motion vector 186 of one of the image-regions 182 in the test video sequence 150 are compared with the same image region 60 (FIG. 15) in the video signature 156.

If the motion vectors 188 compared do not match the video signature 156 (arrow 174), the test video is compared to another one of the video signatures 156 (block 160).

If the motion vectors 188 "match" the video signature 156 (arrow 176), then the test video sequence 150 has been identified as being the video 50 (FIG. 6) used to create the video signature 156 (block 178).

If the part(s) of the test video sequence 150 do not match any of the video signatures 156 in the signature database 16 (FIG. 19), then a video signature is typically created from the test video sequence 150 and added to the signature database 16.

It will be appreciated by those ordinarily skilled in the art that the comparison of the angle sets, power vectors 186 and motion vectors 188, can be performed in any order, for example, but not limited to, the power vectors 186 can be checked before the angle sets.

An alternative method for comparing the test video sequence 150 to the video signature 156 is now described below. The alternative method is substantially the same as the method described above except for the following differences. The angle sets of all the frames 152 of the part of the test video sequence 150 are compared to the angle sets of the video signature 156 to determine how many of the angle sets "match". Due to dropped frames in either the test video sequence 150 or the video 50 (FIG. 6) used to create the video signature 156, or frame rate differences between the test video sequence 150 and the video 50 (FIG. 6) used to create the video signature 156, it is possible that even if the test video sequence 150 is the same video described by the video signature 156, not all the angle sets in the part of the test video sequence 150 will find "matches" in the video signature 156. Therefore, as long as a certain percentage (for example, but not limited to, 80% or more) of the angle sets in the part of the test video sequence 150 "match" the angle sets of the video signature 156, then it can be assumed that the angle sets of the part of the test video sequence 150 and the video signature 156 "match". For ease of comparison, if the angle set of frame X of the test video sequence 150 was matched with frame Y of the video signature 156, then the angle set of frame X+1 of the test video sequence 150 is typically compared with the angle sets of frames Y, Y+1, Y+2 and so on of the video signature 156 until a match is found or not found. If no match is found for the angle set of frame X+1, then the angle set of frame X+2 of the test video sequence 150 is compared with the angle sets of frames Y, Y+1, Y+2 and so on. If a match is found at frame Y+3, then the angle set of frame X+3 of the test video sequence 150 is compared with the angle sets of frames Y+4, Y+5 and so on. In other words, the comparison of the angle sets assumes that the order of the frames 152 in the test video sequence 150 is consistent with the order of the frames 52 (FIG. 6) in the video signature 156 even if some frames are missing or dropped. When the power vectors 188 and motion vectors 186 of the test video sequence 150 are compared with the video signature 156, it is only necessary to check the frames 152 of the test video sequence 150 which produced a "match" during the angle set matching Possible uses of the video signature system 10 include, by way of example only: ensuring an advertisement is still embedded in a video; how many copies of a video exist on the Internet (for example, for legal infringement issues or to know how popular a movie is); how many copies of an advertisement exist on the Internet, and how many advertisement(s) are embedded in their sponsored videos in particular.

The video signature system 10 may allow Webmasters, content owners, broadcaster, advertisers, and others, automated control of videos that are being uploaded and distributed onto their networks. Additionally, the video signature system 10 may allow an automated search of the World Wide Web, including communities and peer-to-peer networks, for example only, to look for full or partial video duplications and pirated copies.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system for creating a video signature, comprising:
   a video retrieval module to retrieve a video sequence having a plurality of frames, each of the frames including an image;
   a region definition module to define a plurality of image regions for the image of each of the frames, such that each of the plurality of image regions occupies the same portion of the image for each of the frames;
   a motion analysis module to:
      calculate a plurality of motion vectors, such that one of the motion vectors is calculated for each of the image regions of each of the frames by comparison to the image of another one of the frames, each of the motion vectors having a direction of motion and a magnitude of motion; and
      determine a plurality of angles including a set of the angles for each of the frames so that for each one of the frames, the set of the angles being defined by angles between the motion vectors for the one frame and a plurality of connecting vectors connecting the motion vectors of the one frame such that each of the angles is defined by one of the motion vectors and one of the connecting vectors; wherein each of the motion vectors has a head and tail, each of the connecting vectors being connected to a tail of one of the motion vectors and a head of another one of the motion vectors; and
   a signature creation module to create the video signature including: data indicative of the direction of motion and the magnitude of motion for each of the image regions of each of the frames; and the set of angles for each of the frames.

2. the system according to claim 1, wherein:
   the image of each of the frames includes at least four of the image regions; and the signature creation module is operative to create the video signature including data indicative of the direction of motion and the magnitude of motion for each of the four image regions of each of the frames.

3. the system according to claim 1, wherein:
each of the image regions includes a plurality of sub-regions; and
the motion analysis module is operative to calculate the one motion vector for each of the image regions of each of the frames by averaging a multiplicity of other motion vectors calculated for the sub-regions.

4. the system according to claim 1, wherein the angles in the set of angles are ordered consistently with respect to the motion vectors for each of the frames.

5. the system according to claim 1, further comprising an image identification module to: identify the image within one of the frames; and determine a measurement of a size of the image, wherein the signature creation module is operative to create the video signature including the measurement of the size of the image.

6. the system according to claim 5, wherein:
the image identification module is operative to determine a measurement of an orientation of the image; and
the signature creation module is operative to create the video signature including a measurement of the orientation of the image.

7. the system according to claim 1, further comprising a discrete cosine transform module to: perform at least one discrete cosine transform for each of the image regions of each of the frames yielding at least one DC coefficient for each of the image regions of each of the frames; and determine a value based on the at least one DC coefficient, wherein the signature creation module is operative to create the video signature including the value for each of the image regions of each of the frames.

8. A system for comparing a video sequence with at least one video signature, the system comprising:
a storage arrangement to store the at least one video signature;
a video retrieval module to retrieve the video sequence having a plurality of frames, each of the frames including an image;
a region definition module to define a plurality of image regions for the image of each of the frames, such that each of the plurality of image regions occupies the same portion of the image for each of the frames;
a motion analysis module to:
calculate a plurality of motion vectors, such that one of the motion vectors is calculated for each of the image regions of each of the frames by comparison to the image of another one of the frames, each of the motion vectors having a direction of motion and a magnitude of motion; and
determine a plurality of angles including a set of the angles for each of the frames so that for each one of the frames, the set of the angles being defined by angles between the motion vectors for the one frame and a plurality of connecting vectors connecting the motion vectors of the one frame such that each of the angles is defined by one of the motion vectors and one of the connecting vectors; wherein each of the motion vectors has a head and tail, each of the connecting vectors being connected to a tail of one of the motion vectors and a head of another one of the motion vectors; and
a signature comparison module to compare: the set of angles for each of the frames with the at least one video signature; and the magnitude of motion of the one motion vector for each of the image regions of each of the frames with the at least one video signature.

9. the system according to claim 8, wherein the signature comparison module is operative to compare the direction of motion of the one motion vector for each of the image regions of each of the frames with the at least one video signature.

10. the system according to claim 8, wherein the image of each of the frames includes at least four of the image regions.

11. the system according to claim 8, wherein:
each of the image regions includes a plurality of sub-regions; and
the motion analysis module is operative to calculate the one motion vector for each of the image regions of each of the frames by averaging a multiplicity of other motion vectors calculated for the sub-regions.

12. the system according to claim 8, wherein the angles in the set of angles are ordered consistently with respect to the motion vectors for each of the frames.

13. the system according to claim 8, further comprising an image identification module to: identify the image within one of the frames; and determine a measurement of a size of the image, wherein the signature comparison module is operative to compare the one motion vector for each of the image regions of at least one of the frames with the at least one video signature based on the measurement of the size of the image.

14. the system according to claim 13, wherein:
the image identification module is operative to determine a measurement of an orientation of the image; and
wherein the signature comparison module is operative to compare the one motion vector for each of the image regions of at least one of the frames with the at least one video signature based on the measurement of the orientation of the image.

15. the system according to claim 8, further comprising a discrete cosine transform module to: perform at least one discrete cosine transform for each of the image regions of each of the frames yielding at least one DC coefficient for each of the image regions of each of the frames; and determine a value based on the at least one DC coefficient, wherein the signature comparison module is operative to compare the value for each of the image regions of each of the frames with the at least one video signature.

16. A method for creating a video signature, comprising:
retrieving a video sequence having a plurality of frames, each of the frames including an image;
defining a plurality of image regions for the image of each of the frames, such that each of the plurality of image regions occupies the same portion of the image for each of the frames;
calculating a plurality of motion vectors, such that one of the motion vectors is calculated for each of the image regions of each of the frames by comparison to the image of another one of the frames, each of the motion vectors having a direction of motion and a magnitude of motion;
determining a plurality of angles including a set of the angles for each of the frames so that for each one of the frames, the set of the angles being defined angles between the motion vectors for the one frame and a plurality of connecting vectors connecting the motion vectors of the one frame such that each of the angles is defined by one of the motion vectors and one of the connecting vectors; wherein each of the motion vectors has a head and tail, each of the connecting vectors being connected to a tail of one of the motion vectors and a head of another one of the motion vectors; and creating the video signature including: data indicative of the direction of motion and the magnitude of motion for each of the image regions of each of the frames; and the set of angles for each of the frames.

17. A method for comparing a video sequence with at least one video signature, the method comprising:
storing the at least one video signature;
retrieving the video sequence having a plurality of frames, each of the frames including an image;
defining a plurality of image regions for the image of each of the frames, such that each of the plurality of image regions occupies the same portion of the image for each of the frames;
calculating a plurality of motion vectors, such that one of the motion vectors is calculated for each of the image regions of each of the frames by comparison to the image of another one of the frames, each of the motion vectors having a direction of motion and a magnitude of motion;
determining a plurality of angles including a set of the angles for each of the frames so that for each one of the frames, the set of the angles being defined by angles between the motion vectors for the one frame and a plurality of connecting vectors connecting the motion vectors of the one frame such that each of the angles is defined by one of the motion vectors and one of the connecting vectors; wherein each of the motion vectors has a head and tail, each of the connecting vectors being connected to a tail of one of the motion vectors and a head of another one of the motion vectors;
comparing the set of angles for each of the frames with the at least one video signature; and
comparing the magnitude of motion of the one motion vector for each of the image regions of each of the frames with the at least one video signature.

18. A system for creating a video signature, comprising:
means for retrieving a video sequence having a plurality of frames, each of the frames including an image;
means for defining a plurality of image regions for the image of each of the frames, such that each of the plurality of image regions occupies the same portion of the image for each of the frames;
means for calculating a plurality of motion vectors, such that one of the motion vectors is calculated for each of the image regions of each of the frames by comparison to the image of another one of the frames, each of the motion vectors having a direction of motion and a magnitude of motion;
means for determining a plurality of angles including a set of the angles for each of the frames so that for each one of the frames, the set of the angles being defined by angles between the motion vectors for the one frame and a plurality of connecting vectors connecting the motion vectors of the one frame such that each of the angles is defined by one of the motion vectors and one of the connecting vectors; wherein each of the motion vectors has a head and tail, each of the connecting vectors being connected to a tail of one of the motion vectors and a head of another one of the motion vectors; and
means for creating the video signature including: data indicative of the direction of motion and the magnitude of motion for each of the image regions of each of the frames; and the set of angles for each of the frames.

19. A system for comparing a video sequence with at least one video signature, the system comprising:
means for storing the at least one video signature;
means for retrieving the video sequence having a plurality of frames, each of the frames including an image;
means for defining a plurality of image regions for the image of each of the frames, such that each of the plurality of image regions occupies the same portion of the image for each of the frames;
means for calculating a plurality of motion vectors, such that one of the motion vectors is calculated for each of the image regions of each of the frames by comparison to the image of another one of the frames, each of the motion vectors having a direction of motion and a magnitude of motion;
means for determining a plurality of angles including a set of the angles for each of the frames so that for each one of the frames, the set of the angles being defined by angles between the motion vectors for the one frame and a plurality of connecting vectors connecting the motion vectors of the one frame such that each of the angles is defined by one of the motion vectors and one of the connecting vectors; wherein each of the motion vectors has a head and tail, each of the connecting vectors being connected to a tail of one of the motion vectors and a head of another one of the motion vectors; and
means for comparing: the set of angles for each of the frames with the at least one video signature; and the magnitude of motion of the one motion vector for each of the image regions of each of the frames with the at least one video signature.

* * * * *